(12) United States Patent
Tochigi et al.

(10) Patent No.: US 9,110,286 B2
(45) Date of Patent: Aug. 18, 2015

(54) REFLECTING TELESCOPE OPTICAL SYSTEM, OPTICAL UNIT, AND IMAGE PICKUP APPARATUS USING THE SAME

(71) Applicant: Olympus Imaging Corp., Tokyo (JP)

(72) Inventors: Akiyoshi Tochigi, Tokyo (JP); Yasuharu Yamada, Kanagawa (JP)

(73) Assignee: OLYMPUS IMAGING CORP., Tokyo (JP)

( * ) Notice: Subject to any disclaimer, the term of this patent is extended or adjusted under 35 U.S.C. 154(b) by 284 days.

(21) Appl. No.: 13/835,204

(22) Filed: Mar. 15, 2013

(65) Prior Publication Data

US 2013/0265475 A1 Oct. 10, 2013

(30) Foreign Application Priority Data

Apr. 5, 2012 (JP) ................... 2012-086399

(51) Int. Cl.
  *G02B 23/02* (2006.01)
  *G02B 23/06* (2006.01)
  *G03B 17/14* (2006.01)

(52) U.S. Cl.
  CPC ............... *G02B 23/02* (2013.01); *G02B 23/06* (2013.01); *G03B 17/14* (2013.01)

(58) Field of Classification Search
  CPC ......... G02B 23/02; G02B 23/06; G03B 17/14
  USPC .................. 359/364–366, 399, 727, 730, 731
  See application file for complete search history.

(56) References Cited

U.S. PATENT DOCUMENTS

| | | | |
|---|---|---|---|
| 2,817,270 A * | 12/1957 | Mandler | 359/730 |
| 3,700,310 A | 10/1972 | Rayces | |
| 3,711,185 A * | 1/1973 | McKinley | 359/731 |
| 3,926,505 A | 12/1975 | Rayces | |
| 4,523,816 A | 6/1985 | Kreitzer | |
| 4,695,139 A * | 9/1987 | Bagby et al. | 359/366 |
| 4,738,500 A * | 4/1988 | Grupp et al. | 359/199.3 |
| 4,783,158 A * | 11/1988 | Shackman | 359/366 |
| 5,331,467 A | 7/1994 | Sato | |
| 5,471,346 A * | 11/1995 | Ames | 359/731 |
| 5,537,250 A * | 7/1996 | Masunaga et al. | 359/430 |
| 6,317,262 B1* | 11/2001 | Hardin | 359/399 |
| 8,767,318 B2* | 7/2014 | Hatakeyama | 359/731 |
| 8,896,938 B2* | 11/2014 | Hatakeyama | 359/731 |
| 2003/0053204 A1* | 3/2003 | Wise | 359/399 |
| 2003/0218801 A1* | 11/2003 | Korniski et al. | 359/407 |

(Continued)

FOREIGN PATENT DOCUMENTS

| | | |
|---|---|---|
| JP | 49-066339 | 6/1974 |
| JP | 51-036133 | 3/1976 |

(Continued)

*Primary Examiner* — Frank Font
(74) *Attorney, Agent, or Firm* — Kenyon & Kenyon LLP

(57) ABSTRACT

A reflecting telescope optical system comprises, a main reflecting mirror, a sub reflecting mirror which is disposed at a position facing a reflecting surface of the main reflecting mirror, and a plurality of lens units which is disposed at a position facing a reflecting surface of the sub reflecting mirror. The reflecting surface of the main reflecting mirror is a concave surface, and a reflecting area is formed to be ring-shaped. The reflecting surface of the main reflecting mirror and the reflecting surface of the sub reflecting mirror are mutually facing. The first operation is a movement for focusing at an object positioned between infinity and a near position, and the second operation is a reciprocating movement for changing the focused state after focusing. An amount of movement in the first operation is larger than an amount of movement in the second operation.

41 Claims, 25 Drawing Sheets

(56) References Cited

U.S. PATENT DOCUMENTS

2008/0252964 A1* 10/2008 Koenig .................... 359/366
2009/0015914 A1* 1/2009 Duncan et al. ............. 359/399

FOREIGN PATENT DOCUMENTS

| | | |
|---|---|---|
| JP | 58-205124 | 11/1983 |
| JP | 60-049313 | 3/1985 |
| JP | 61-039015 | 2/1986 |
| JP | 63-098618 | 4/1988 |
| JP | 03-018162 | 3/1991 |
| JP | 04-016087 | 3/1992 |
| JP | 05-053058 | 3/1993 |
| JP | 05341204 A * 12/1993 ............. G02B 23/16 |

* cited by examiner

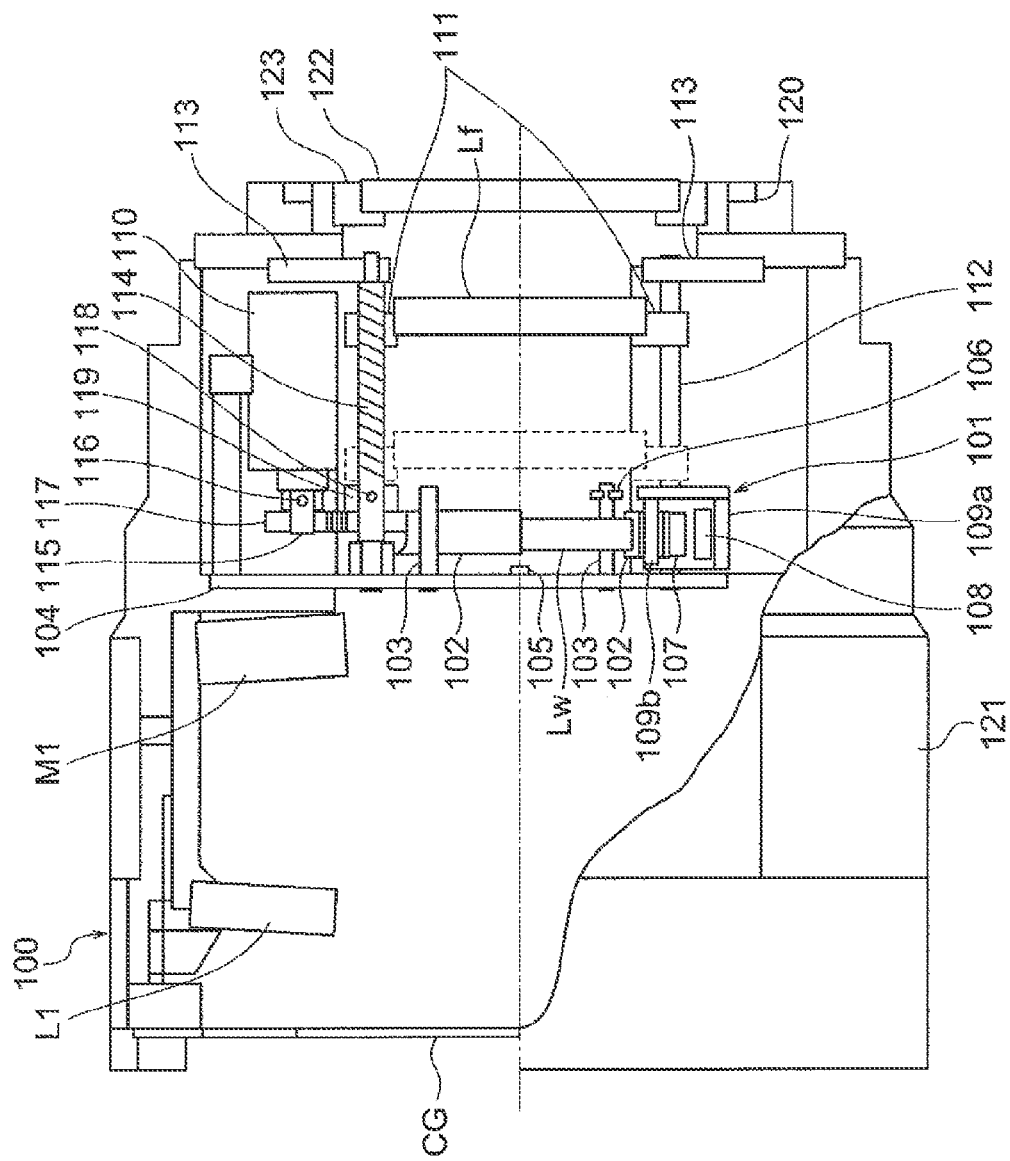

436.84 – – –
656.27 ⋯⋯⋯
587.56 ———

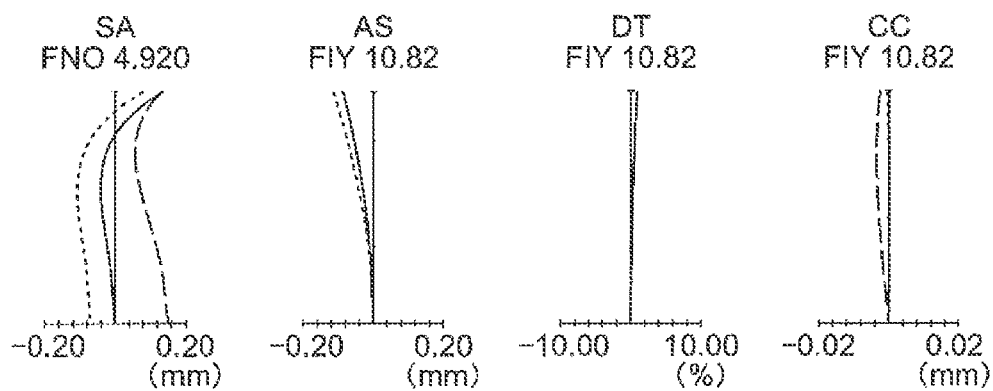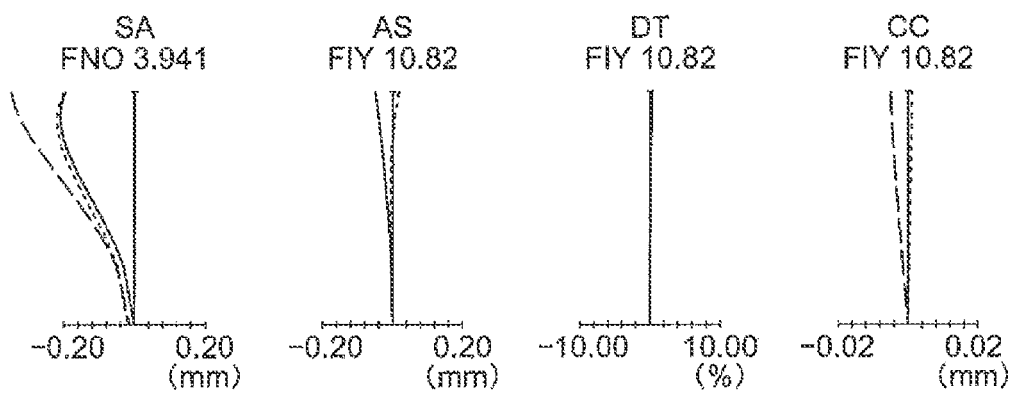

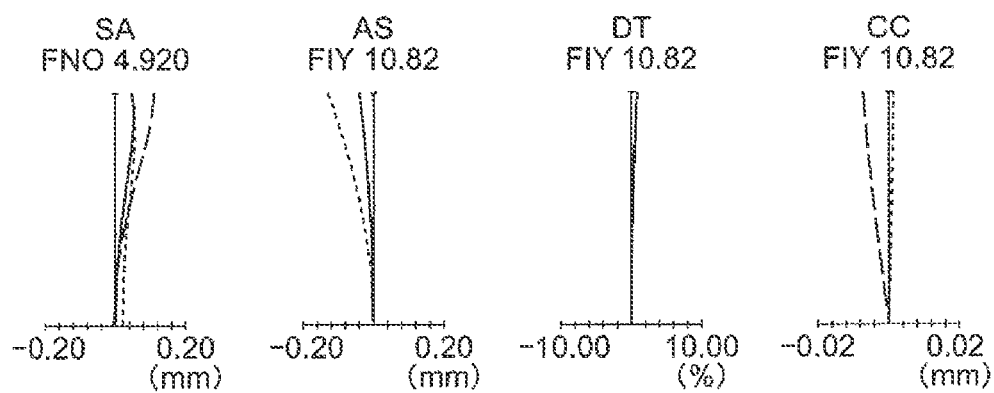
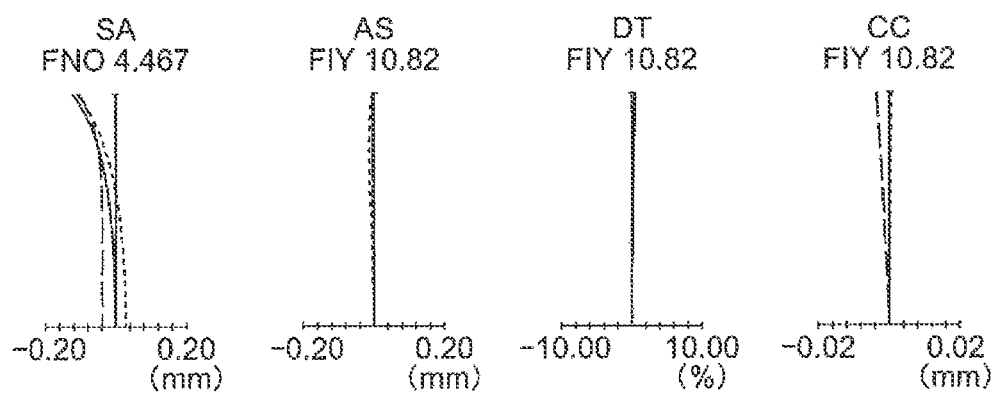

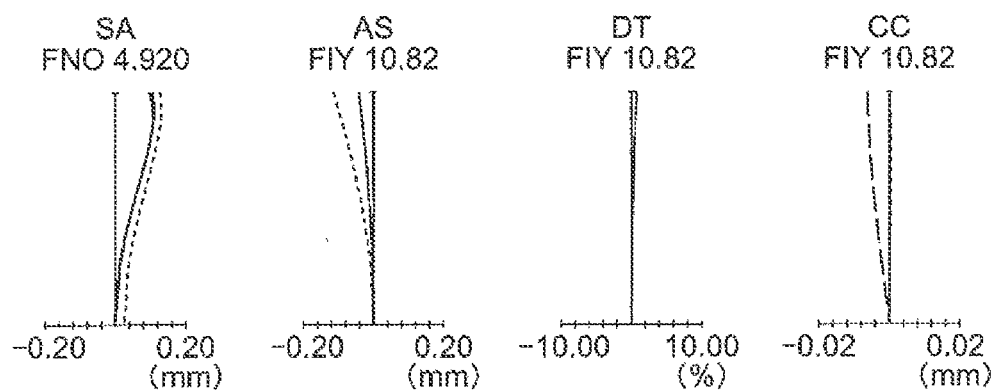
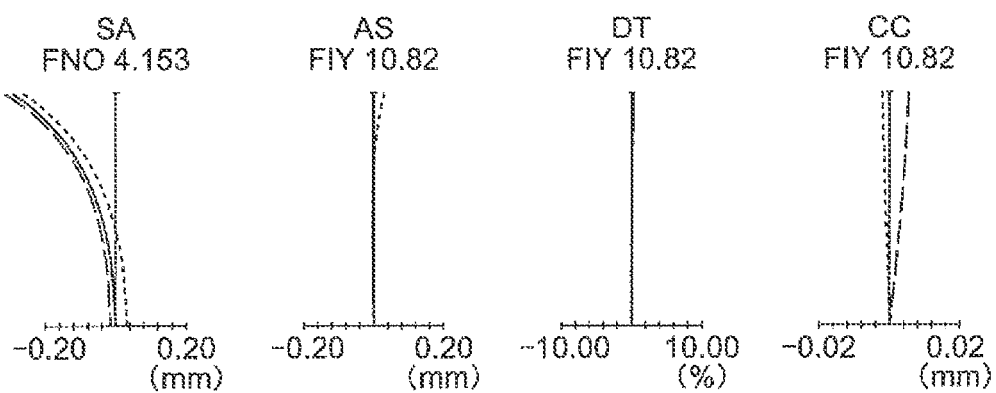

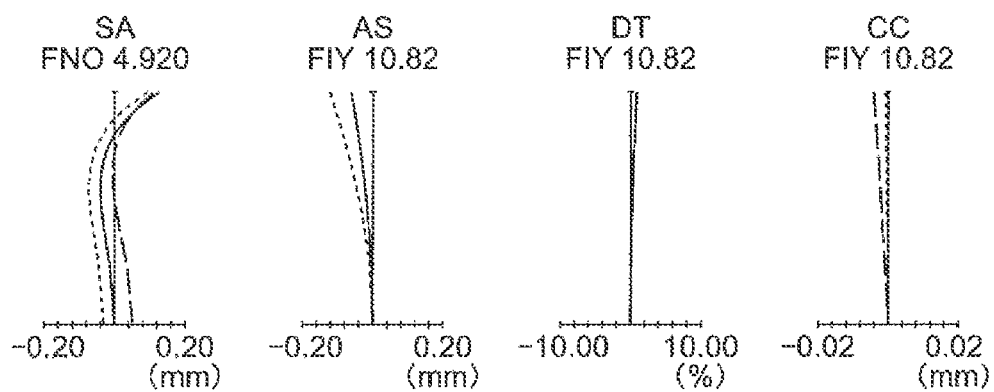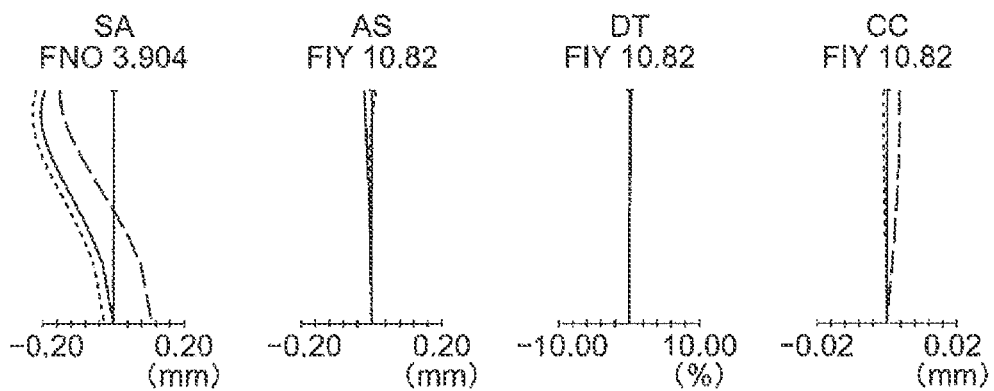

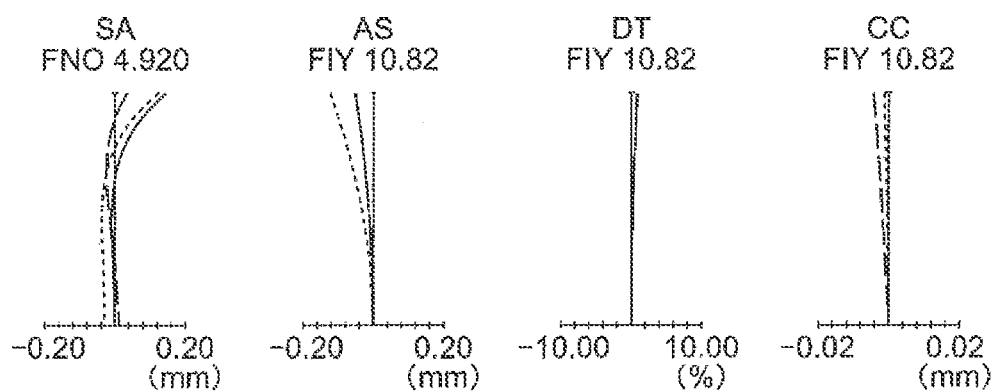
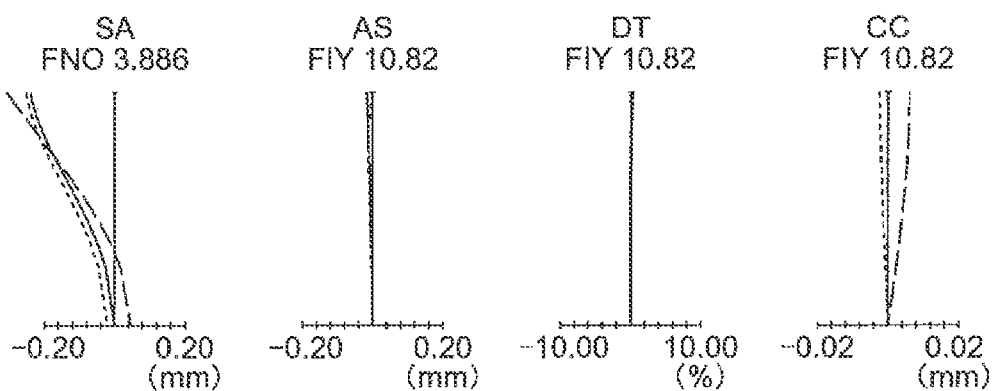

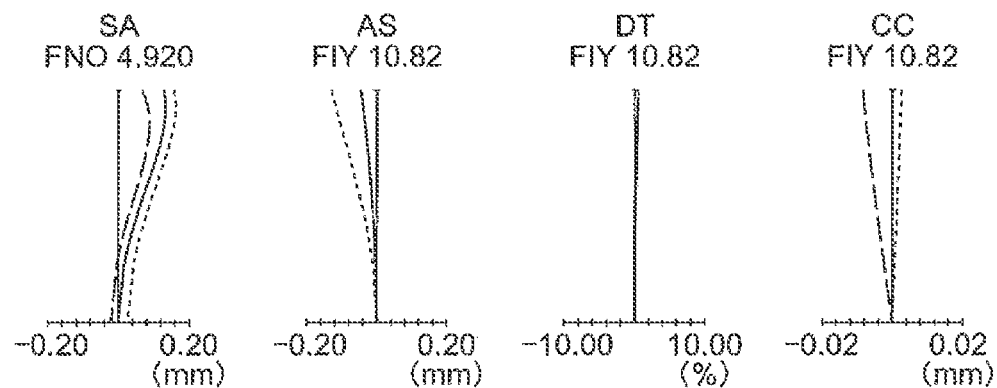
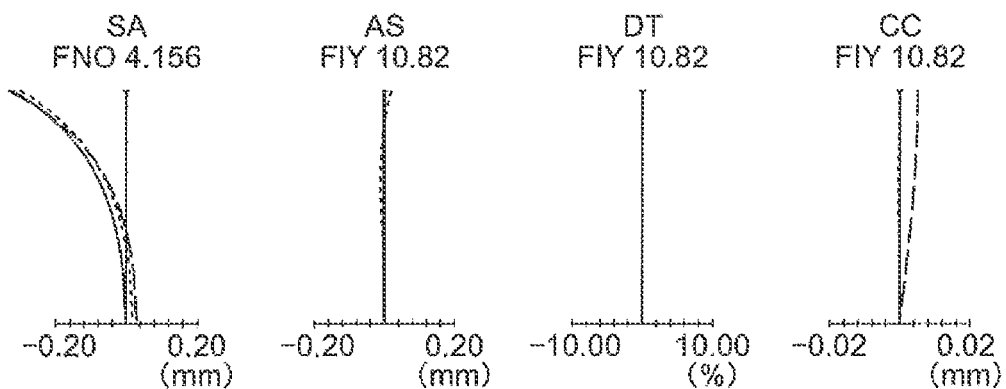

REFLECTING TELESCOPE OPTICAL SYSTEM, OPTICAL UNIT, AND IMAGE PICKUP APPARATUS USING THE SAME

CROSS-REFERENCE TO RELATED APPLICATION

The present application is based upon and claims the benefit of priority from the prior Japanese Patent Application No. 2012-086399 filed on Apr. 5, 2012; the entire contents of which are incorporated herein by reference.

BACKGROUND OF THE INVENTION

1. Field of the Invention

The present invention relates to a reflecting telescope optical system, an optical unit, and an image pickup apparatus using the same.

2. Description of the Related Art

In the past, a small-size reflecting telescope optical system in which, an overall length of the optical system is shortened by using a main reflecting mirror and a sub reflecting mirror has been known. As a method of focusing in the reflecting microscope optical system, (i) a method of drawing the overall optical system out, (ii) a method of changing a distance of the main reflecting mirror and the sub reflecting mirror, and (iii) a method of moving a rear-side lens unit in an optical axial direction while maintaining a distance of the main reflecting mirror and the sub reflecting mirror to be constant have been known. In a case of carrying out video shooting by a reflecting telescope optical system, a method mentioned in (iii) is suitable as a method of focusing.

At the time of focusing, a lens is moved. However, not only a lens, but also a mechanical member is moved at the time of focusing. Therefore, it is necessary to secure appropriately a light weight of a lens to be moved, and a space for disposing the mechanical member. As a reflecting telescope optical system in which, the method mentioned in (iii) has been adopted, optical systems described in Japanese Patent Application Laid-open Publication Nos. Hei 5-53058, Sho 63-98618, Sho 60-49313, Sho 51-36133, and Sho 49-66339, and Japanese Patent Publication after Examination Nos. Hei 4-16087 and Hei 3-18162 are available.

Incidentally, in video photography, it is necessary to maintain a focused state by making an auto focus, function all the time. As a method of focusing, a phase-difference auto focus (AF) method and a contrast autofocus method (a so-called mountain-climbing method) are available. In the auto focus in video photography, the contrast AF method has been adopted. In the contrast AF, a change in contrast is measured by moving a focusing lens unit by a minute amount all the time in the vicinity of a focused position. Moreover, a change in the focused state (a shift from the focused state) is detected from the change in the contrast. An operation of moving the focusing lens unit by a minute amount is called as wobbling.

Moreover, in a case in which, the focused state is judged to have been changed; it is possible to bring back the focused state once again by moving the focusing lens unit appropriately. By such wobbling function, it is possible to maintain continuously the focused state all the time even when a distance from an object has changed. However, according to a frame rate which has been set on a camera main-body side, an extremely high-velocity movement is necessary for wobbling, or in other words, for moving the focusing lens unit.

SUMMARY OF THE INVENTION

A reflecting telescope optical system according to the present invention comprises a main reflecting mirror, a sub reflecting mirror which is disposed at a position facing a reflecting surface of the main reflecting mirror, and a plurality of lens units which is disposed at a position facing a reflecting surface of the sub reflecting mirror, wherein the reflecting surface of the main reflecting mirror is a concave surface, and a reflecting area is formed to be ring-shaped, and the reflecting surface of the main reflecting mirror and the reflecting surface of the sub reflecting mirror are mutually facing, and a first operation and a second operation are carried out by at least one lens unit in the plurality of lens units, and both the first operation and the second operation are movements of the at least one lens unit in a direction along an optical axis, and the first operation is a movement for focusing at an object positioned between infinity and a near position, and the second operation is a reciprocating movement for changing the focused state after focusing, and an amount of movement in the first operation is larger than an amount of movement in the second operation.

Moreover, an optical unit according to the present invention comprises the reflecting telescope optical system described above, and a holding member which holds the reflecting telescope optical system, and the holding member includes a mount portion which is installable on and detachable from an image pickup apparatus main-body.

An image pickup apparatus according to the present invention comprises the reflecting telescope optical system described above, and an image pickup element which is disposed on an image side of the reflecting telescope optical system, and which converts an image formed by the reflecting telescope optical system, to an electric signal.

BRIEF DESCRIPTION OF THE DRAWINGS

FIG. 3 is a diagram showing a moving mechanism in an optical unit according to the present invention;

FIG. 4A is a cross-sectional view at the time of focusing at an object at infinity, and FIG. 4B is a cross-sectional view at the time of focusing at a near object;

FIG. 5A is a cross-sectional view at the time of focusing at an object at infinity, and FIG. 5B is a cross-sectional view at the time of focusing at a near object;

FIG. 6A is a cross-sectional view at the time of focusing at an object at infinity, and FIG. 6B is a cross-sectional view at the time of focusing at a near object;

FIG. 7A is a cross-sectional view at the time of focusing at an object at infinity, and FIG. 7B is a cross-sectional view at the time of focusing at a near object;

FIG. 8A is a cross-sectional view at the time of focusing at an object at infinity, and FIG. 8B is a cross-sectional view at the time of focusing at a near object;

FIG. 9A is a cross-sectional view at the time of focusing at an object at infinity, and FIG. 9B is a cross-sectional view at the time of focusing at a near object;

FIG. 10A is a cross-sectional view at the time of focusing at an object at infinity, and FIG. 10B is a cross-sectional view at the time of focusing at a near object;

FIG. 11A is a cross-sectional view at the time of focusing at an object at infinity, and FIG. 11B is a cross-sectional view at the time of focusing at a near object;

FIG. 12A is a cross-sectional view at the time of focusing at an object at infinity, and FIG. 12B is a cross-sectional view at the time of focusing at a near object;

FIG. 14A, FIG. 14B, FIG. 14C, FIG. 14D, FIG. 14E, FIG. 14F, FIG. 14G, and FIG. 14H (hereinafter, 'FIG. 14A to FIG. 14H') are aberration diagrams of the reflecting telescope optical system according to the second example, and are aberration diagrams of two different focused states;

FIG. 16A, FIG. 16B, FIG. 16C, FIG. 16D, FIG. 16E, FIG. 16F, FIG. 16G, and FIG. 16H (hereinafter, 'FIG. 16A to FIG. 16H') are aberration diagrams of the reflecting telescope optical system according to the fourth example, and are aberration diagrams of two different focused states;

FIG. 17A, FIG. 17B, FIG. 17C, FIG. 17D, FIG. 17E, FIG. 17F, FIG. 17G, and FIG. 17H (hereinafter, 'FIG. 17A to FIG. 17H') are aberration diagrams of the reflecting telescope optical system according to the fifth example, and are aberration diagrams of two different focused states;

FIG. 18A, FIG. 18B, FIG. 18C, FIG. 18D, FIG. 18E, FIG. 18F, FIG. 18G, and FIG. 18H (hereinafter, 'FIG. 18A to FIG. 18H') are aberration diagrams of the reflecting telescope optical system according to the sixth example, and are aberration diagrams of two different focused states;

FIG. 20A, FIG. 20B, FIG. 20C, FIG. 20D, FIG. 20E, FIG. 20F, FIG. 20G, and FIG. 20H (hereinafter, 'FIG. 20A to FIG. 20H') are aberration diagrams of the reflecting telescope optical system according to the eighth example, and are aberration diagrams of two different focused states;

FIG. 21A, FIG. 21B, FIG. 21C, FIG. 21D, FIG. 21E, FIG. 21F, FIG. 21G, and FIG. 21H (hereinafter, 'FIG. 21A to FIG. 21H') are aberration diagrams of the reflecting telescope optical system according to the ninth example, and are aberration diagrams of two different focused states;

DETAILED DESCRIPTION OF THE INVENTION

Figure 1:
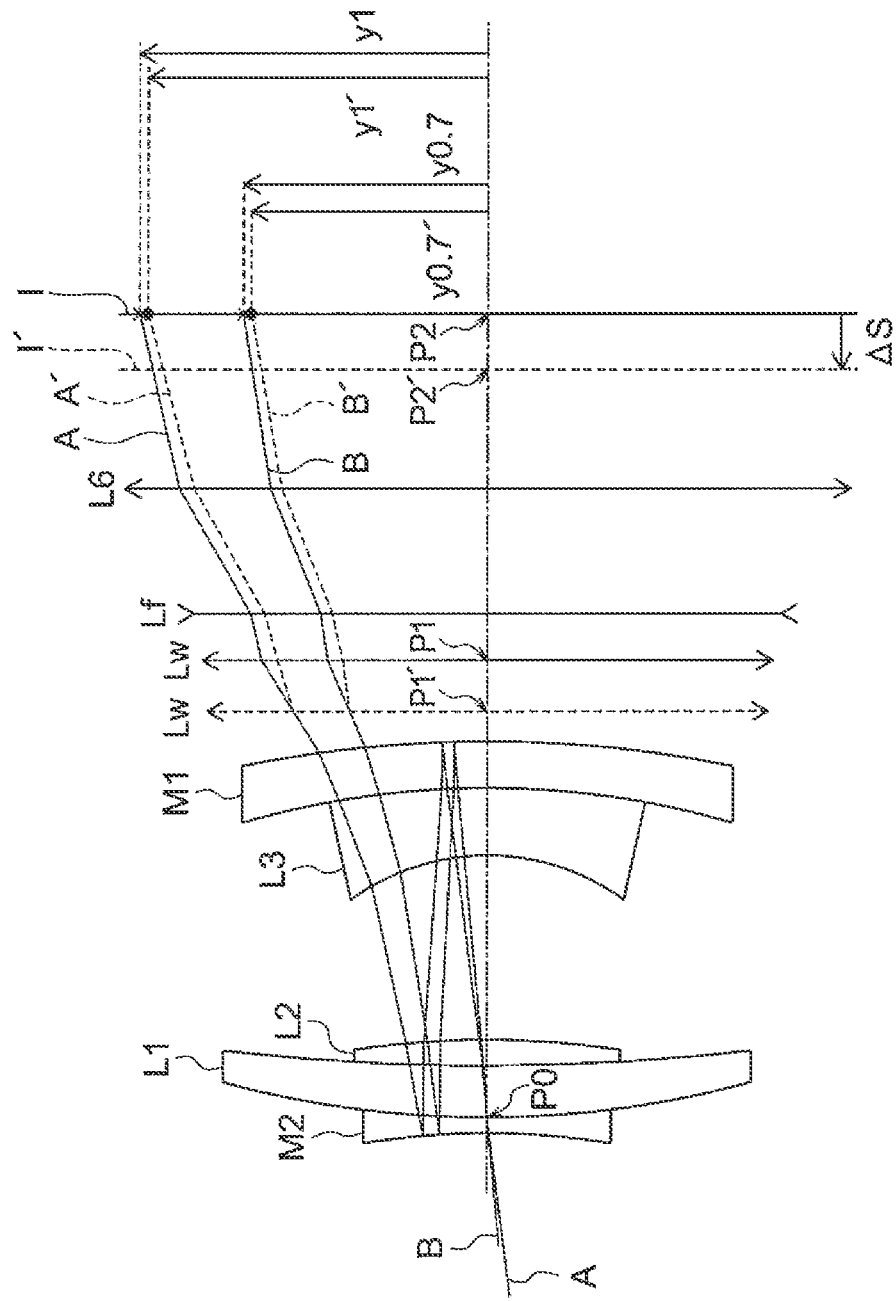
FIG. 1 is a schematic diagram for explaining a definition of parameters of conditional expressions (3) and (4) in a reflecting telescope optical system according to the present invention.

Exemplary embodiments of a reflecting telescope optical system, an optical unit, and an image pickup apparatus according to the present invention will be described below in detail by referring to the accompanying diagrams. However, the present invention is not restricted to the embodiments described below. In the following description, the reflecting telescope optical system may also be called as only the 'optical system'.

A reflecting telescope optical system according to a first aspect of the present embodiment includes, a main reflecting mirror, a sub reflecting mirror which is disposed at a position facing a reflecting surface of the main reflecting mirror, and a plurality of lens units which is disposed at a position facing a reflecting surface of the sub reflecting mirror, and the reflecting surface of the main reflecting mirror is a concave surface, and a reflecting area is formed to be ring-shaped, and the reflecting surface of the main reflecting mirror and the reflecting surface of the sub reflecting mirror are mutually facing, and a first operation and a second operation are carried out by at least one lens unit in the plurality of lens units, and both the first operation and the second operation are movements of the at least one lens unit in a direction along an optical axis, and the first operation is a movement for focusing at an object positioned between infinity to near position, and the second operation is a reciprocating movement for changing the focused state after focusing, and an amount of movement in the first operation is larger than an amount of movement in the second operation.

The optical system according to the first aspect of the present embodiment includes the main reflecting mirror, the sub reflecting mirror which is disposed at the position facing the reflecting surface of the main reflecting mirror, and the plurality of lens units which is disposed at the position facing the reflecting surface of the sub reflecting mirror. Moreover, the reflecting surface of the main reflecting mirror is a concave surface, and the reflecting area is formed to be ring-shaped, and the reflecting surface of the main reflecting mirror and the reflecting surface of the sub reflecting mirror are mutually facing.

With such an arrangement, light from an object (hereinafter, may also be called as a 'subject') is reflected at the main reflecting mirror to be directed toward the sub reflecting mirror, and next, is reflected at the sub reflecting mirror to be directed toward the plurality of lens units. Since the light reciprocates between the main reflecting mirror and the sub reflecting mirror, it is possible to shorten an overall length of the optical system.

Moreover, in the optical system according to the first aspect of the present embodiment, the first operation and the second operation are carried out by at least one lens unit in the plurality of lens units. Here, both the first operation and the second operation are movements of the at least one lens unit in the direction along the optical axis.

The first operation is a movement for focusing at an object positioned between infinity and near position. In a case in which, an image of a subject which has been selected for photography has not been formed clearly on an image plane, or in other words, in a case of a state of defocus (unfocused state), the first operation is to be carried out.

The second operation is an operation which is to be carried out after the first operation, or in other words, after the focusing is over. Even when the subject has been focused by the first operation, as the subject moves, an unfocused state is assumed. In a case of carrying out video photography, it is necessary to maintain a state in which, the subject is focused all the time. Therefore, the second operation is carried out after completion of the first operation. The second operation is called as 'wobbling'.

When an amount of defocus at the time of the first operation and an amount of defocus at the time of the second operation are compared, the amount of defocus at the time of first operation is larger in many cases. This is because, at the time of the second operation, it is a state of defocus which is generated after focusing at the subject once. Therefore the amount of defocus at the time of the second operation is smaller. Therefore, the amount of movement in the first operation becomes larger than the amount of movement in the second operation.

The position of the subject which has been selected for photography, sometimes almost coincides with a focused position of the optical system. In such a case, sometimes, the amount of movement in the first operation becomes smaller than the amount of movement in the second operation.

Moreover, in the optical system according to the first aspect of the present embodiment, while light reciprocates between the main reflecting mirror and the sub reflecting mirror, it is possible to make a diameter of a bundle of ray smaller gradually. Therefore, a diameter of the bundle of ray which has been reflected at the sub reflecting mirror becomes gradually smaller toward an image side. In such case, a diameter of the bundle of rays which is incident on the plurality of lens units, such as a lens unit (hereinafter, may also be called as a 'wobbling lens unit') which carries out the second operation, becomes small. Therefore, in the optical system according to the first aspect of the present embodiment, it is possible to make small a size in a radial direction of a lens in the wobbling lens unit.

In the second operation, the wobbling lens unit is made to undergo reciprocating movement in the direction along the optical axis. For carrying out the second operation, a drive element such as a motor (a second motor) which moves the wobbling lens unit, and a drive section (a second drive section) are necessary. The drive section is a mechanism which converts rotation of the motor to the movement of the wobbling lens unit.

Here, the motor and the drive section have been mentioned as the 'second motor' and the 'second drive section'. However, the term second is used by merely associating with the 'second operation'. In other words, it is not presupposed that there is another motor called as a 'first motor' apart from the second motor, and that there is another drive section called as a 'first drive section' apart from the second drive section. It is also possible to make an arrangement such that the first operation and the second operation are made to be carried out by one motor and one drive section.

As it has been mentioned above, the diameter of the bundle of rays reflected at the sub reflecting mirror becomes smaller gradually toward the image side. Therefore, a comparatively wider space is formed on the image side of the sub reflecting mirror. Therefore, by disposing the motor and the drive section in the space formed, it is possible to reduce a size in a radial direction, as the optical unit. As a result, it is possible to realize a reflecting telescope optical system or an optical unit which is small-size and suitable for video shooting. The optical unit includes a reflecting telescope optical system, a motor, and a drive section.

Moreover, in the reflecting telescope optical system according to the first aspect of the present embodiment, it is preferable that the lens unit which carries out the second operation is disposed at a position facing the sub reflecting mirror, sandwiching the main reflecting mirror.

When such an arrangement is made, the wobbling lens unit is disposed on the image side of the main reflecting mirror. As it has been mentioned above, the diameter of the bundle of rays which has been reflected at the sub reflecting mirror become smaller gradually toward the image side. In such case, the diameter of the bundle of rays becomes further smaller on the image side of the main reflecting mirror. Therefore, even wider space is formed on the image side of the main reflecting mirror. As a result, it is possible to dispose the wobbling lens unit, the motor, and the drive section in the space formed.

When it is possible to dispose the motor and the drive section near the wobbling lens unit, it is possible to shorten a frame member which holds the wobbling lens unit. Moreover, when it is possible to shorten the frame member, it is possible to make the frame member light-weight. Here, since the frame member is moved by a motor, as the frame member is made light-weight, it is possible to reduce a load on the motor. As a result, it is possible to save electric power and reduce noise of the motor and the drive section.

Disposing the wobbling lens on the object side of the main reflecting mirror is not preferable from the point of view of making the frame member light-weight. When such an arrangement is made, for letting the bundle of rays not to be shielded, the frame member has to be made long in an optical axial direction. In such case, since it is not possible to make the frame member light-weight, the load on the motor becomes large.

Moreover, in the reflecting telescope optical system according to the first aspect of the present embodiment, it is preferable that lens unit which carries out the second operation includes not more than three lenses.

In the reflecting telescope optical system according to the first aspect of the present embodiment, it is preferable that the lens unit which carries out the second operation includes not more than two lenses.

In the reflecting telescope optical system according to the first aspect of the present embodiment, it is preferable that the lens unit which carries out the second operation includes one lens.

By making such arrangement, it is possible to make the wobbling lens unit light-weight. A motor is to be used for moving the wobbling lens unit. When the wobbling lens unit is made light-weight, it is possible to reduce the load on the motor. As a result, it is possible to save electric power and to reduce noise of the motor and the drive section.

Moreover, in the reflecting telescope optical system according to the first aspect of the present embodiment, it is preferable that the first operation and the second operation are carried out by one lens unit.

By carrying out the first operation (focusing) and the second operation (wobbling) by one lens unit, it is possible to reduce the number of motors and drive sections.

Moreover, in the reflecting telescope optical system according to the first aspect of the present embodiment, it is preferable that the first operation and the second operation are carried out by different lens units, and that the lens unit which carries out the first operation is disposed at a position facing the sub reflecting mirror, sandwiching the main reflecting mirror.

As it has been mentioned above, the wide space is formed on the image side of the main reflecting mirror. Therefore, even when the first operation and the second operation are carried out by different lens units, it is possible to dispose the lens units in the wide space formed.

In the first operation, the lens unit is moved in the direction along the optical axis. For moving the lens unit, a drive element such as a motor (a first motor) and a drive section (a first drive section) which moves the lens unit (hereinafter, may also be called as a focusing lens unit) which carries out the first operation become necessary. The drive section is a mechanism which converts the rotation of the motor to a movement of the focusing lens unit.

Here, as it has been mentioned above, it is possible to dispose also the abovementioned components on the image side of the main reflecting mirror, along with the focusing lens unit. In such case, similarly as in the wobbling lens unit, since it is possible to shorten a frame member of the focusing lens unit, it is possible to save electric power and to reduce noise of the motor and the drive section.

Moreover, in the reflecting telescope optical system according to the first aspect of the present embodiment, it is preferable that the lens unit which carries out the first operation includes not more than three lenses.

Moreover, in the reflecting telescope optical system according to the first aspect of the present embodiment, it is preferable that the lens unit which carries out the first operation includes not more than two lenses.

In the reflecting telescope optical system according to the first aspect of the present embodiment, it is preferable that the lens unit which carries out the first operation includes one lens.

By making such arrangement, it is possible to make the focusing lens unit light-weight. A motor is to be used for moving the focusing lens unit. When the focusing lens unit is made light-weight, it is possible to reduce a load on the motor. As a result, it possible to save electric power, and to reduce noise of the motor and the drive section.

Moreover, in the reflecting telescope optical system according to the first aspect of the present embodiment, it is preferable that the following conditional expression (1) is satisfied.

$$0.01 < DFL/MFL < 0.3 \quad (1)$$

where,

DFL denotes an optical axial thickness of the lens unit which carries out the first operation, MFL is expressed by $|L1-L2|$, in which, both L1 and L2 are distances from the lens unit which carries out the first operation, up to an image plane, L1 denotes a distance at the time of focusing at an object at infinity, and L2 denotes a distance at the time of focusing at a near object.

Conditional expression (1) is a conditional expression which is preferable for securing appropriately an amount of movement of the focusing lens unit at the time of focusing operation, while making a thickness of the focusing lens unit small.

Securing the optical axial thickness of the focusing lens unit appropriately, such that a lower limit value of conditional expression (1) is not surpassed, is favorable for securing sufficiently a stiffness of the focusing lens unit.

Suppressing the optical axial thickness of the focusing lens unit appropriately, such that an upper limit value of conditional expression (1) is not surpassed, is favorable for securing appropriately the amount of movement of the focusing lens unit.

Moreover, in the reflecting telescope optical system according to the first aspect of the present embodiment, it is preferable that the following conditional express (2) is satisfied.

$$0.7 < MFL/fb_{min} < 2.0 \quad (2)$$

where, $fb_{min}$ denotes the minimum value of back focus at an air conversion length, MFL is expressed by $|L1-L2|$, in which, both L1 and L2 are distances from the lens unit which carries out the first operation, up to the image plane, L1 denotes the distance at the time of focusing at an object at infinity, and L2 denotes the distance at the time of focusing at a near object.

By securing the amount of movement of the focusing lens unit with respect to aback focus appropriately such that a lower limit value of conditional expression (2) is not surpassed, it is possible to make a refractive power of the focusing lens unit small. Moreover, by making an arrangement such that the lower limit value of conditional expression (2) is not surpassed, it is favorable for reduction of aberration which occurs at the focusing lens unit, saving the number of lenses, and making the focusing lens unit light-weight.

Suppressing the amount of movement of the focusing lens unit moderately such that an upper limit value of conditional expression (2) is not surpassed is favorable for shortening the overall length of the reflecting telescope optical system.

Moreover, in the reflecting telescope optical system according to the first aspect of the present embodiment, it is preferable that the plurality of lens units includes a lens unit of which, a position is fixed, and that the lens unit which is fixed is facing the sub reflecting mirror, sandwiching the main reflecting mirror, as well as is disposed at a position farthest from the main reflecting mirror.

When such an arrangement is made, in a case in which, the optical system is held by a member such as a frame member (lens frame); it is possible to close an image side of the holding member by the lens unit which is fixed. When the lens unit is moved, a noise such as a sound of moving is generated. Therefore, by making the abovementioned arrangement, it is favorable for reducing noise leakage.

Moreover, in the reflecting telescope optical system according to the first aspect of the present embodiment, it is preferable that the reflecting telescope optical system includes a front unit and a rear unit, and the front unit includes the main reflecting mirror and the sub reflecting mirror, and the rear unit includes a lens unit which carries out the first operation, and a lens unit which carries out the second operation, and is disposed at a position facing the sub reflecting mirror, sandwiching the main reflecting mirror, and during the first operation, the front unit is fixed, and the front unit includes a first lens, the main reflecting mirror, and the sub reflecting mirror, in order of traveling of light, and the main reflecting mirror is a back-surface mirror, and the sub reflecting mirror is a back-surface mirror and is disposed adjacent to the first lens.

In a case in which, the optical system is divided into two lens units namely, the front unit (front lens unit) and the rear unit (rear lens unit), a diameter of a bundle of rays in the front unit is larger as compared to a diameter of a bundle of rays in the rear unit. Here, when the front unit includes the main reflecting mirror and the sub reflecting mirror, a diameter of the main reflecting mirror and a diameter of the sub reflecting mirror become large. Therefore, it is not preferable to move the main reflecting mirror and the sub reflecting mirror. So, in the first operation (during focusing), it is preferable to keep the front unit fixed (to keep stationary).

Moreover, at a position facing the sub reflecting mirror, sandwiching the main reflecting mirror, or in other words, on the image side of the main reflecting mirror, the diameter of bundle of rays becomes smaller as compared to the diameter of bundle of rays on the main reflecting mirror side. Therefore, the rear unit is disposed at such position, and an arrangement is made such that the rear unit includes the focusing lens unit and the wobbling lens unit. When such an arrangement is made, it is possible to make small a size in a radial direction of lenses in these lens units. As a result, it is possible to make the lens unit light-weight. Moreover, it is possible to dispose the motor and the drive section in the space on the image side of the main reflecting mirror. Therefore, such arrangement is favorable for small-sizing when an interchangeable lens is used, and the moving mechanism is simplified.

Moreover, in the front unit, it is preferable to dispose the first lens, the main reflecting mirror, and the sub reflecting mirror such that a light ray travels in order of the first lens, the main reflecting mirror, and the sub reflecting mirror. When such an arrangement is made, the first lens and the sub reflecting mirror are to be disposed at positions facing the main reflecting mirror. Therefore, it is possible to dispose the sub reflecting mirror adjacent to the first lens. In such manner, disposing the sub reflecting mirror near the first lens is favorable for shortening the overall length of the optical system.

Moreover, it is preferable to let both the main reflecting mirror and the sub reflecting mirror to be back-surface mirrors. When such an arrangement is made, it is possible to protect a reflecting surface, and to use a refracting surface for aberration correction.

Moreover, in the reflecting telescope optical system according to the first aspect of the present embodiment, it is preferable that the front unit includes a second lens and a third lens, and that the first lens is a positive meniscus lens having a convex surface directed toward an object side, and the sub reflecting mirror is cemented to an object-side surface of the first lens, and the second lens is cemented to an image-side surface of the first lens, and the third lens is cemented to an object-side surface of the main reflecting mirror.

Integrating the first lens, the sub reflecting mirror, and the second lens as well as integrating the main reflecting mirror and the third lens in such manner is favorable for shortening the overall length of the optical system.

Moreover, in the reflecting telescope optical system according to the first aspect of the present embodiment, it is preferable that the rear unit includes in order from an object side to an image side, a lens unit which carries out the second operation, a lens unit which carries out the first operation, and a lens unit having a positive refractive power, of which, a position is fixed, and that the lens unit which carries out the first operation has a negative refractive power.

Disposing the wobbling lens unit, the focusing lens unit, and the fixed lens unit in this order on the image side of the main reflecting mirror is favorable for making small a change in magnification caused due to the movement of the wobbling lens unit. Moreover, a height of an off-axis ray which is emerged from the wobbling lens unit changes with the movement of the wobbling lens unit. Therefore, it is preferable to dispose the focusing lens and the fixed lens on the image side of the main reflecting mirror, or more elaborately, on the image side of the wobbling lens unit. When such an arrangement is made, since the change in the height of a light ray on an image pickup surface becomes small, it is possible to make small the change in magnification which is due to the movement of the wobbling lens unit.

Even when the lens unit which carries out the second operation and the lens unit which carries out the first operation are let to be the same lens unit, it is possible to achieve the action and effect described above. Moreover, in such case, a refractive power of the lens unit which carries out the first operation, or in other words, a refractive power of the wobbling lens unit becomes negative.

Moreover, letting a refractive power of the focusing lens unit to be negative is favorable for reducing an aberration fluctuation which is due to the movement of the focusing lens unit at the time of focusing operation.

Moreover, in the reflecting telescope optical system according to the first aspect of the present embodiment, it is preferable that the lens unit which carries out the second operation has a positive refractive power.

Letting the refractive power of the wobbling lens unit to be positive is favorable for reducing a change in magnification of image which is due to the movement of the wobbling lens unit at the time of wobbling.

In a case in which, the focusing lens unit and the wobbling lens unit are same, it is preferable that the refractive power of the wobbling lens unit is also negative.

Moreover, in the reflecting telescope optical system according to the first aspect of the present embodiment, it is preferable that the following conditional expressions (3) and (4) are satisfied.

$$|y1'-y1/\Delta s<0.10 \quad (3)$$

$$|y0.7'-y0.7|/\Delta s<0.10 \quad (4)$$

where, y1 denotes the maximum image height at the time of focusing at an object at infinity, y0.7 is 0.7 times of the maximum image height, and is expressed by y1×0.7, y1' denotes a height of a light ray at a position at which, a first virtual principal ray intersects with an image pickup surface when a defocus amount Δs is generated at the time of focusing at an object at infinity, y0.7' denotes a height of a light ray at a position at which, a second virtual principal ray intersects with the image pickup surface when the defocus amount Δs is generated at the time of focusing at an object at infinity, Δs denotes a defocus amount which is generated in the second operation, and is expressed by 8×y1/1000, the first virtual principal ray is a virtual principal ray with an angle of view same as of a ray which reaches the image height y1 at the time of focusing at an object at infinity, the second virtual principal ray is a virtual principal ray with an angle of view same as of a ray which reaches the image height y0.7 at the time of focusing at an object at infinity, a virtual principal ray is a virtual ray which passes through a point at which, a surface on the object side of the first lens and an optical axis intersect, and unit of each of y1, y0.7, y1', y0.7', and Δs is mm.

Conditional expressions (3) and (4) are conditional expressions which regulate an amount of change in the magnification of image with respect to the amount of defocus, and are conditional expressions for suppressing the change in the magnification of image to be small. By satisfying both conditional expressions (3) and (4), it is possible to make small the change in the magnification of image at each image height. In other words, it is possible to make small the change in the magnification of image throughout from a center up to a periphery of an image which is obtained by image pickup. Moreover, even in a case in which, a focal length has changed, by satisfying both conditional expressions (3) and (4), it is possible to achieve the effect described above.

When an upper limit value of conditional expressions (3) and (4) is surpassed, the amount of change in the magnification of image becomes large. In such case, the magnification of image changes substantially according to the image height. As a result, distortion of image occurs.

The defocus amount Δs changes according to an extent to which, the change in the magnification of image is permissible and it is preferable that it is an amount equivalent to permissible depth. Generally, it is possible to express the permissible depth by F-number×permissible diameter of circle of confusion. Therefore, in the optical system according to the first aspect of the present embodiment, the F-number is let to be 8, and the permissible diameter of circle of confusion is let to be, the permissible diameter of circle of confusion=the maximum image height (y1)/1000.

Figure 2:
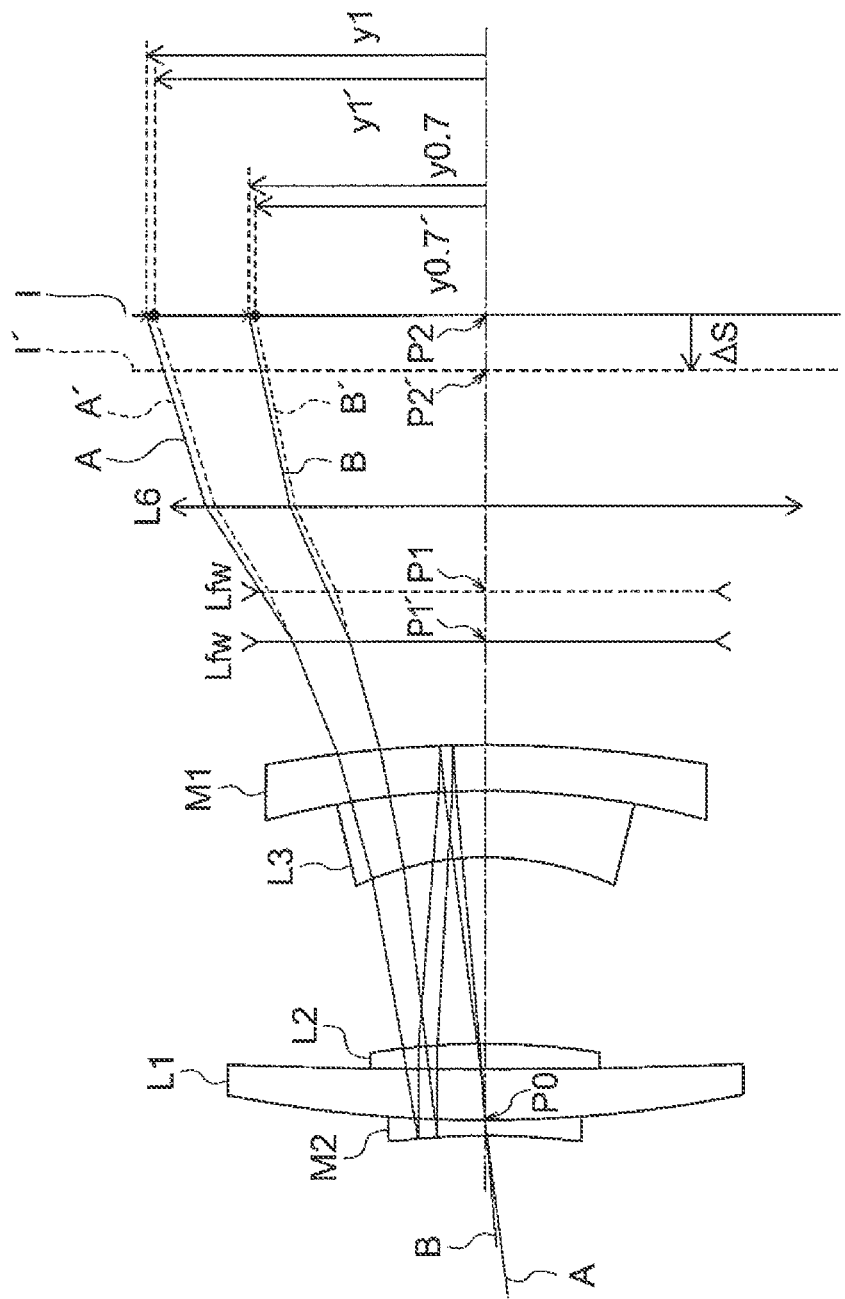
FIG. 2 is a schematic diagram for explaining a definition of parameters of conditional expressions (3) and (4) in the reflecting telescope optical system according to the present invention.

FIG. 1 and FIG. 2 are diagrams for explaining y1, y0.7, y1', y0.7', and Δs. For the sake of expediency, regarding the rear unit, the description is made upon simplifying a lens shape. In FIG. 1 and FIG. 2, a lens for which, arrows in both sides of a straight line are directed toward an outer side (direction away from the optical axis) is a positive lens, and a lens for which, arrows in both sides of a straight line are directed toward an inner side (direction toward the optical axis) is a negative lens.

FIG. 1 is a case in which, the wobbling lens unit and the focusing lens unit are different lens units, and a wobbling lens unit Lw is a positive lens, a focusing lens unit Lf is a negative lens, and a sixth lens L6 is a positive lens. The sixth lens L6 is a lens unit having a positive refractive power, and of which, a position is fixed.

FIG. 2 is a case in which, the wobbling lens unit and the focusing lens unit are the same lens unit (one lens unit), and a lens unit Lfw is a negative lens and a sixth lens L6 is a positive lens. The sixth lens is a lens unit having a positive refractive power, of which, a position is fixed.

In FIG. 1, a virtual light ray which passes through a point P0 is shown. Here, the point P0 is a point at which a surface on an object side of a first lens L1 and an optical axis intersect. Out of the virtual light ray which passes through the point P0, a virtual light ray A shows a virtual principal ray which is incident at the maximum image height (y1). Moreover, a virtual light ray B shows a virtual principal ray which is incident on a position 0.7 times (y0.7) of the maximum image height (y1). Here, y0.7=y1×0.7. The virtual light ray A and the virtual light ray B are virtual principal rays when focused at an object at infinity. Moreover, the virtual light ray A and the virtual light ray B are light rays when a position of the wobbling lens unit Lw is a position P1.

The virtual light rays A and B are reflected at a main reflecting mirror M1 after passing through a first lens L1 and a second lens L2. The virtual light rays A and B which are reflected at the main reflecting mirror M1 are reflected at a sub reflecting mirror M1 after passing through the second lens L2 and the first lens L1. The virtual light rays A and B which have been reflected at the sub reflecting mirror M1, pass once again through the first lens L1, the second lens L2, and a third lens L3, and reach an image forming surface I.

In a case of carrying out wobbling, the wobbling lens unit Lw is made to reciprocate in a direction along an optical axis. FIG. 1 shows a situation when the wobbling lens unit Lw is moved from the position P1 to a position P1'. A position P2 is a position of the image forming surface (image pickup surface) I when the optical system has focused at an object at infinity. As the wobbling lens unit Lw moves from the position P1 to the position P1', the position of the image forming surface I moves from the position P2 to a position P2'. The position P2' is a position of an image forming surface I' when defocused, and is away by ΔS from the position P2. An amount of movement of the wobbling lens unit Lw and an amount of ΔS are shown to be exaggerated.

When the position of the wobbling lens unit Lw changes from the position P1 to the position P1', an angle of the virtual light ray A emerging from the wobbling lens unit Lw changes. In other words, a light ray emerging from the wobbling lens unit Lw becomes a virtual light ray A' (first virtual principal ray). Similarly, an angle of the virtual light ray B emerging from the wobbling lens unit Lw also changes. In other words, a light ray emerging from the wobbling lens unit Lw becomes a virtual light ray B' (second virtual principal ray).

Shifting of the virtual light ray A and the virtual light ray A', and shifting of the virtual light ray B and the virtual light ray B' are shown to be exaggerated.

The virtual light ray A' is a light ray reaching the image height of y1 at the time of focusing at an object at infinity, or in other words, is a light ray of a same angle of view as an angle of view of the virtual light ray A. The virtual light ray A', after emerging from the wobbling lens unit Lw, passes through the focusing lens Lf and the sixth lens L6, and intersects with the image forming surface I of the position P2. A distance from the optical axis up to the point of intersection is y1'.

The virtual light ray B' is a light ray reaching the image height of y0.7 at the time of focusing at an object at infinity, or in other words, is a light ray of a same angle of view as an angle of view of the virtual light ray B. The virtual light ray B', after emerging from the wobbling lens unit Lw, passes through the focusing lens Lf and the sixth lens L6, and intersects with the image forming surface I of the position P2. A distance from the optical axis up to the point of intersection is y0.7°.

Even in FIG. 2, y1' and y0.7' are obtained by the virtual light ray A' and the virtual light ray B' respectively. However, the virtual light ray A' and the virtual light ray B' are light rays when a position of the lens unit Lfw is the position P1'. In such manner, even in a case in which, the wobbling lens unit and the focusing lens unit are the same lens unit Lfw, the concept of y1, y0.7, y1', y0.7', and Δs is same as the concept in FIG. 1.

Moreover, in the reflecting telescope optical system according to the first aspect of the present embodiment, it is preferable that the following conditional expression (5) is satisfied.

$$0.13 < |f_w/f| < 0.52 \quad (5)$$

where, f denotes a focal length of the overall reflecting telescope optical system at the time of focusing at an object at infinity, and $f_w$ denotes a focal length of the lens unit which carries out the second operation.

Conditional expression (5) is a conditional expression regarding a preferable refractive power which the lens unit which carries out the second operation, or in other words, the wobbling lens unit, should have.

By securing the refractive power of the wobbling lens unit appropriately such that a lower limit value of conditional expression (5) is not surpassed, an aberration fluctuation which is due to the movement of a lens at the time of wobbling is suppressed while reducing the number of lenses in the wobbling lens unit.

By suppressing the refractive power of the wobbling lens unit from becoming large such that an upper limit value of conditional expression (5) is not surpassed, it is possible to make small an amount of movement of the wobbling lens unit at the time of wobbling. As a result, it is favorable for small-sizing of the overall reflecting telescope optical system.

Moreover, in the reflecting telescope optical system according to the first aspect of the present embodiment, it is preferable that the following conditional expression (6) is satisfied.

$$0.12 < |f_f/f| < 0.43 \qquad (6)$$

where, f denotes the focal length of the overall reflecting telescope optical system at the time of focusing at an object at infinity, and $f_f$ denotes a focal length of the lens unit which carries out the first operation.

Conditional expression (6) is a conditional expression which specifies a preferable refractive power which the lens unit which carries out the second operation, or the focusing lens unit, should have.

By securing the refractive power of the focusing lens unit appropriately such that a lower limit value of conditional expression (6) is not surpassed, an aberration fluctuation which is due to the movement of a lens at the time of focusing is suppressed while reducing the number of lenses in the focusing lens unit.

By securing the refractive power of the focusing lens unit appropriately such that an upper limit value of conditional expression (6) is not surpassed, it is possible to make small an amount of movement of the focusing lens unit at the time of focusing. As a result, it is favorable for small-sizing of the overall reflecting telescope optical system.

Moreover, in the reflecting telescope optical system according to the first aspect of the present embodiment, it is preferable that the following conditional expression (7) is satisfied.

$$1.0 < \Sigma D_f / \Sigma D_r < 3.0 \qquad (7)$$

where, $\Sigma D_f$ denotes the maximum value of an optical axial length from a surface nearest to the object side of the front unit up to a surface nearest to the image side of the front unit, and $\Sigma D_r$ denotes the maximum value of an optical axial length from a surface nearest to the object side of the rear unit up to a surface nearest to the image side of the rear unit.

Conditional expression (7) is a conditional expression related to a favorable length (an overall length of the unit) which each of the front unit and the rear unit should have.

By securing the overall length of the front unit appropriately such that a lower limit value of conditional expression (7) is not surpassed, it is possible to shorten the overall length of the reflecting telescope optical system even when the main reflecting mirror and the sub reflecting mirror are used. It is possible to realize an optical system having a short overall length, in which, characteristics of the reflecting telescope optical system have been applied.

By securing the overall length of the rear unit appropriately such that an upper limit value of conditional expression (7) is not surpassed, it becomes easy to secure a space for the movement of the lenses appropriately. The movement of the lenses is a movement at the time of wobbling and focusing.

Moreover, a reflecting telescope optical system according to a second aspect of the present embodiment includes a main reflecting mirror, a sub reflecting mirror which is disposed at a position facing a reflecting surface of the main reflecting mirror, and a lens unit which is disposed at a position facing a reflecting surface of the sub reflecting mirror, and the reflecting surface of the main reflecting mirror is a concave surface, and a reflecting area is formed to be ring-shaped, and the reflecting surface of the main reflecting mirror and the reflecting surface of the sub reflecting mirror are mutually facing, and a first operation is carried out by the lens unit, and the first operation is a movement for focusing at an object positioned between infinity and a near position, and the lens unit during the operation, is disposed at a position facing the sub reflecting mirror, sandwiching the main reflecting mirror, and the following conditional expression (6) is satisfied.

$$0.12 < |f_f/f| < 0.43 \qquad (6)$$

where, f denotes a focal length of the overall reflecting telescope optical system at the time of focusing at an object at infinity, and $f_f$ denotes a focal length of the lens unit which carries out the first operation.

A positional relationship of the main reflecting mirror, the sub reflecting mirror, the lens unit, and an action and an effect of the shape of the main reflecting mirror etc. in the optical system according to the second aspect of the present embodiment are as have already been explained. By disposing the lens unit which carries out the first operation, or in other words, the focusing lens unit, at the abovementioned position, it is possible to shorten the frame member which holds the focusing lens unit.

Moreover, the lens unit is disposed at the position facing the sub reflecting mirror, sandwiching the main reflecting mirror. Therefore, it is possible to carry out focusing by the first lens, and at this time, small-sizing and weight reduction of a lens of the lens unit (focusing lens unit) are possible. Moreover, it is possible to dispose the motor and the drive section in the space on the image side of the main reflecting mirror. Therefore, such arrangement is favorable for small-sizing when an interchangeable lens is used, and when the moving mechanism is simplified. Moreover, by making the refractive power of the focusing lens appropriately weak, it is favorable for making the focusing lens light-weight. By these effects, it is possible to reduce a load on a drive mechanism (such as a motor).

A technical significance, and an action and an effect of conditional expression (6) are as already been described.

Moreover, in the reflecting telescope optical system according to the second aspect of the present embodiment, it is preferable that the lens unit which carries out the first operation includes not more than three lenses.

Moreover, in the reflecting telescope optical system according to the second aspect of the present embodiment, it is preferable that the lens unit which carries out the first operation includes not more than two lenses.

Moreover, in the reflecting telescope optical system according to the second aspect of the present embodiment, it is preferable that the lens unit which carries out the first operation includes one lens.

A technical significance, and an action and an effect of the abovementioned arrangement are as already been described.

Moreover, in the reflecting telescope optical system according to the second aspect, it is preferable that the reflecting telescope optical system includes a front unit and a rear unit, and the front unit includes the main reflecting mirror and the sub reflecting mirror, and the rear unit includes the lens unit, and is disposed at a position facing the sub reflecting mirror, sandwiching the main reflecting mirror, and during the first operation, the front unit is fixed, and the front unit includes a first lens, the main reflecting mirror, and the sub reflecting mirror, in order of traveling of light, and the main reflecting mirror is a back-surface mirror, and the sub reflecting mirror is a back-surface mirror, and is disposed adjacent to the first lens.

In the arrangement which has already been described earlier, the lens unit which carries out the first operation and the lens unit which carries out the second operation are different lens units. Whereas, the abovementioned arrangement differs at a point that functions of the two lens units are made to be carried out by one lens unit. However, a technical significance, and an action and an effect of the abovementioned arrangement are same as the technical significance, and the action and the effect which have already been described.

Moreover, in the reflecting telescope optical system according to the second aspect of the present embodiment, it is preferable that the following conditional expression (6') is satisfied.

$$0.17 < |f_f/f| < 0.38 \quad (6')$$

where, f denotes the focal length of the overall reflecting telescope optical system at the time of focusing at an object at infinity, and $f_f$ denotes a focal length of the lens unit which carries out the first operation.

A technical significance of conditional expression (6') is same as the technical significance of conditional expression (6). By satisfying conditional expression (6'), it is possible to improve the action and the effect of conditional expression (6).

Moreover, in the reflecting telescope optical system according to the second aspect of the present embodiment, it is preferable that the rear unit includes not more than three lenses.

By making such arrangement, it is favorable for small-sizing and weight-reduction of the reflecting telescope optical system.

Moreover, in the reflecting telescope optical system according to the second aspect of the present embodiment, it is preferable that a reflecting surface of the sub reflecting mirror is a convex surface.

By making such arrangement, it is possible to form a substantially afocal optical system with a main reflecting mirror and a sub reflecting mirror. As a result, it is favorable for shortening the overall length of the optical system while making the focal length of the overall optical system long. Moreover, it is also favorable for reduction of chromatic aberration.

Moreover, an optical unit according to a first aspect of the present embodiment, includes one of the reflecting telescope optical systems described above, and a holding member which holds the reflecting telescope optical system, and the holding member includes a mount portion which is installable on an detachable from a main-body of an image pickup apparatus.

By making such arrangement, it is possible to use the reflecting telescope optical system as an interchangeable lens.

Moreover, an optical unit according to a second aspect of the present embodiment, includes one of the reflecting telescope optical systems described above, a first motor which is disposed on an image side with respect to the main reflecting mirror, and outside an optical path, and a first drive section which carries out the first operation by driving the first motor.

By making such arrangement, since it is possible to dispose the first motor near the focusing lens unit, it is favorable for achieving both, the small-sizing of the optical system and speeding up of an auto focus.

Moreover, an optical unit according to a third aspect of the present embodiment includes one of the reflecting telescope optical systems described above, a second motor which is disposed on an image side with respect to the main reflecting mirror, and outside an optical path, and a second drive section which carries out the second operation by driving the second motor.

By making such arrangement, since it is possible to dispose the second motor near the wobbling lens unit, it is favorable for achieving both, the small-sizing of the optical system and speeding up of an auto focus.

Moreover, an image pickup apparatus according the present embodiment includes one of the reflecting telescope optical systems described above, and an image pickup element which is disposed on an image side of the reflecting telescope optical system, and which converts an image formed by the reflecting telescope optical system, to an electric signal.

An example of a mechanism for carrying out the first operation and the second operation is shown in FIG. 3. In FIG. 3, each of the wobbling lens unit Lw, the focusing lens unit Lf, a fixed lens unit 122, the main reflecting mirror M1, the first lens (positive meniscus lens) L1 is shown by one parallel and flat plate.

To start with, an arrangement and an operation related to the second operation, or in other words, wobbling, will be described below. For the wobbling lens unit Lw, an arrangement is made such that the wobbling is carried out in conjunction with an operation of a linear motor 101.

The wobbling lens unit Lw is moved by the linear motor 101 which is the second motor, and the second drive section. The second drive section includes a holding frame 102, a shaft 103, an object-side shaft attachment 104, an object-side stopper 105, an image-side stopper 106, a coil 107, a permanent magnet 108, an outer yoke 109a, and an inner yoke 109b.

The wobbling lens unit Lw is held by the holding frame 102. The holding frame 102 is an annular flat plate having an opening portion at a central portion, and is provided with through holes (some of which are not shown in the diagram) at a plurality of locations of an annular portion. Moreover, a plurality of shafts 103 is provided to be inserted through the through holes. The shaft 103 is a shaft for moving the wobbling lens unit Lw. One end of the shaft 103 is fixed to the object-side shaft attachment 104. The object-side shaft attachment 104 is fixed to an interchangeable lens main-body 100.

The object-side shaft attachment 104 has an opening portion at a central portion thereof. A size of the opening portion is such that an effective optical path (light rays passing through an optical system) is not shielded. The object-side shaft attachment 104 is positioned at the image side (right side on the paper surface) of the main reflecting mirror M1.

The object-side shaft attachment 104 is provided with the object-side stopper 105. The object-side stopper 105 restricts the wobbling lens unit Lw from moving excessively toward the object side (left side on the paper surface). The object-side stopper 105 is provided outside the effective optical path. By the holding frame 102 interfering with the object-side stopper 105, movement of the holding frame 102 (the wobbling lens unit Lw) is inhibited.

On the other hand, the shaft 103 is provided with the image-side stopper 106. The image-side stopper 106 restricts the wobbling lens unit Lw from moving excessively toward the image side. The image-side stopper 106 also, is provided outside the effective optical path.

The linear motor 101 is a moving-coil motor. The linear motor 101 is coupled with the holding frame 102. The wobbling lens unit Lw oscillates in the optical axial direction by the linear motor 101.

The linear motor 101 includes the coil 107, the permanent magnet 108, the outer yoke 109a, and the inner yoke 109b. The coil 107 is disposed at a position (lower side of the paper surface) facing the holding frame 102. Moreover, the permanent magnet 108 is disposed at a position facing the coil 107. The outer yoke 109a is integrated with the permanent magnet 108. Moreover, the outer yoke 109a and the inner yoke 109b are integrated.

It is preferable to dispose the outer yoke 109a and the inner yoke 109b such that the coil 107 is sandwiched by the outer yoke 109a and the inner yoke 109b. Lines of magnetic force are directed from the permanent magnet 108 toward the coil 107, and by making such arrangement, it is possible to maintain the direction of lines of magnetic force (magnetic field) to be uniform. Here, the permanent magnet 108 is disposed such that a side of the coil 107 becomes an N-pole (North Pole) and the other side becomes an S-pole (South Pole).

At a location where the magnetic field is almost uniform, an electric current flowing through the coil 107 flows such as reciprocating in a direction perpendicular to the paper surface. By the electric current flowing through the coil 107, according to Flemming's left-hand rule, the coil 107, the holding frame 102, and the wobbling lens unit Lw integrally reciprocate along the shaft 103. The wobbling is carried out by reciprocating movement.

The linear motor 101 which moves the lens unit at the time of wobbling is positioned on the image side of the main reflecting mirror M1, and outside the effective optical path. By making such arrangement, since it is possible to utilize a space inside the interchangeable lens main-body 100 effectively, it is favorable for small-sizing of the interchangeable lens main-body 100.

As shown in FIG. 3, the linear motor 101 and the second drive section are positioned on the image side of the main reflecting mirror M1. Since a diameter of a bundle of rays is small on the image side of the main reflecting mirror M1, it is possible to make small a diameter of a lens which constitutes the focusing lens unit Lf and the wobbling lens unit Lw. Therefore, it is possible to dispose the linear motor 101 and the second drive section outside the effective optical path (a space through which light rays don't pass). In such manner, in the optical system according to the present embodiment, since it is possible to utilize effectively the space inside the interchangeable lens main-body 100, it is favorable for small-sizing of the optical system.

Next, an arrangement and an operation related to the first operation, or in other words, focusing, will be described below. For the focusing lens unit Lf, an arrangement is made such that the focusing is carried out in conjunction with an axial rotation of a DC (direct current) motor 110.

The focusing lens unit Lf is moved by the DC motor 110 which is the first motor, and the first drive section. The first drive section includes the object-side shaft attachment 104, a holding frame 111, a shaft 112, an image-side shaft attachment 113, a shaft 114, a lock pin 116, a first gear 117, a lock pin 118, and a second gear 119.

The focusing lens unit Lf is held by the holding frame 111. The holding frame 111 is an annular flat plate having an opening portion at a central portion, and is provided with a through hole at an upper side and a lower side of an annular portion. Moreover, the shaft 112 is provided to be inserted through the through hole at the lower side. The shaft 112 is a shaft for moving the focusing lens unit Lf. One end side of the shaft 112 is fixed to the object-side shaft attachment 104, and the other end side of the shaft 112 is fixed to the image-side shaft attachment 113. Both the object-side shaft attachment 104 and the image-side shaft attachment 113 are fixed to the interchangeable lens main-body 100.

An inner surface of the through hole at the upper side is formed as a nut (having screw threads formed), and is engaged with the shaft 114. The shaft 114 is a shaft for moving the focusing lens unit Lf, and is of a screw type (having screw threads formed on a surface thereof). The shaft 114 is held by the object-side shaft attachment 104 and the image-side shaft attachment 113, to be turnable (movable around the axis forward and backward).

The DC motor 110 has a motor rotating shaft 115. A position of the DC motor 110 is fixed with respect to the interchangeable lens main-body 100. The first gear 117 is fixed to the motor rotating shaft 115 via the lock pin 116. Whereas, the second gear 119 is fixed to the shaft 114 via the lock pin 118. Moreover, the first gear 117 and the second gear 119 are coupled by concavity and convexity which are not shown in the diagram.

As the motor rotating shaft 115 rotates, the first gear 117 rotates. Rotation of the first gear 117 is transmitted to the second gear 119, and the second gear 119 rotates. Here, the second gear 119 is fixed to the shaft 114 via the lock pin 118. Therefore, with the rotation of the second gear 119, the shaft 114 rotates. Moreover, with the rotation of the shaft 114, the holding frame 111 and the focusing lens unit Lf move in an axial direction of the shaft 114.

In FIG. 3, positions of the focusing lens Lf are indicated by solid lines and by dashed lines. A position of the focusing lens unit Lf indicated by the solid lines is a position when focused at a near object. Whereas, a position of the focusing lens unit Lf indicated by the dashed lines is a position when focused at an object at infinity.

As shown in FIG. 3, the DC motor 110 and the first drive section are positioned on the image side of the main reflecting mirror M1. On the image side of the main reflecting mirror M1, since a diameter of a bundle of rays is small, it is possible to make a diameter of each of the focusing lens unit Lf and the wobbling lens unit Lw small. Therefore, it is possible to dispose the DC motor 110 and the first drive section outside the effective optical path (space through which, light rays don't pass). In such manner, in the optical system according to the present embodiment, since it is possible to utilize the space inside the interchangeable lens main-body 100, it is favorable for small sizing of the optical system.

An arrangement may be made such that the first operation and the second operation are carried out by one lens unit. In such case, an arrangement may be made such that the second operation, or in other words, the wobbling, is also carried out by the focusing lens unit Lf. In a case of carrying out wobbling by the focusing lens unit Lf, a motor rotating shaft of the DC motor 110 is to be turned reciprocatably by a minute angle of turning. In such manner, it is possible to let the focusing lens unit Lf to be the wobbling lens unit Lw.

A mount portion 120 is provided to an end portion on the image side of the interchangeable lens main-body 100. By the mount portion 120, it is possible to mount the interchangeable lens main-body 100 on a camera main-body (not shown in the diagram). Moreover, by imparting electrical contact points to the mount portion 120, a supply of an electric power to each component of the interchangeable lens main-body 100 from an electric power source of the camera main-body, as well as transceiving of control signals, become possible through the mount portion 120.

In such manner, by the supply of the electric power and the supply of signals from the camera main-body, the wobbling by the wobbling lens unit Lw is carried out by operating the linear motor 101, and the focusing by the focusing lens unit Lf is carried out by operating the DC motor 110. In a case of using the focusing lens unit Lf also as the wobbling lens unit Lw, the electric power and signals from the camera main-body are supplied to the DC motor 110, and accordingly, by operating the DC motor 110, the wobbling by the focusing lens unit Lf is carried out.

By the wobbling, an image in which, a contrast changes minutely in a time series is achieved from an image pickup element inside the camera main-body. From the minute change of contrast, it is possible to identify a focusing state of the subject. Based on the identification of the focusing state, a direction of rotation and an amount of rotation of the DC motor 110 for focusing are computed in the camera main-body, and the electric power and a signal are supplied to the DC motor 110. According to such control, an auto focus in video photography becomes possible.

Moreover, an operating ring 121 is provided to the interchangeable lens main-body 100. The operating ring 21 is turnable with respect to the interchangeable lens main-body 100. When the operating ring 121 is turned, a signal based on an angle of turning is output to the camera main-body. In the camera main-body, an angle of rotation of the motor rotating shaft 115 is computed from the signal, and a signal for driving the DC motor 110 is generated. Moreover, by supplying the signal generated and the electric power to the DC motor 110, the focusing lens unit Lf is moved. When an arrangement is made in such manner, manual focus is possible.

In the interchangeable lens main-body 100, the fixed lens unit 122 is disposed nearest to the image side of the optical path. The fixed lens unit 122 is fixed to the interchangeable lens main-body 100 via a holding frame 123. By making such arrangement, it is favorable for preventing entry of dust, and reducing leakage of sound due to movement of the lens unit. Moreover, a cover glass CG is disposed on the image side of the positive meniscus lens L1. Such arrangement is also favorable for preventing entry of dust, and reducing leakage of operation sound. Moreover, in the example in FIG. 3, by applying black color on a portion of the cover glass CG outside the effective optical path, an arrangement is made to reduce a ghost and flare due to stray light. A portion, through which a light beam passes, is ring-shaped.

It is preferable that each arrangement mentioned above is satisfied plurally at the same time.

Moreover, for each conditional expression, it is preferable that an upper limit value and a lower limit value are let to be as follow. When such an arrangement is made, it is possible to achieve the effect more assuredly.

For conditional expression (1), it is preferable to let the lower limit value to be 0.05 and the upper limit value to be 0.26.

For conditional expression (2), it is preferable to let the lower limit value to be 0.75 and the upper limit value to be 1.40.

For conditional expressions (3) and (4), it is preferable to the upper limit value to be 0.05.

For conditional expression (5), it is preferable to let the lower limit value to be 0.18 and the upper limit value to be 0.47.

For conditional expression (6), it is preferable to let the lower limit value to be 0.17 and the upper limit value to be 0.38.

For conditional expression (7), it is preferable to let the lower limit value to be 1.15 and the upper limit value to be 2.70.

The abovementioned reflecting telescope optical system may satisfy the plurality of arrangements simultaneously. Making such an arrangement is preferable for achieving a reflecting telescope optical system having a favorable optical performance, an optical unit, and an image pickup apparatus. Moreover, a combination of the favorable arrangement is arbitrary. For each conditional expression, only an upper limit value or a lower limit value of a numerical range of a conditional expression which is further restricted, may be restricted.

Examples of the reflecting telescope optical system and an image pickup apparatus according to the present invention will be described below in detail by referring to the accompanying diagrams. However, the present invention is not restricted to the examples described below.

Examples from a first example to a ninth example of the reflecting telescope optical system according to the present invention will be described below. Lens cross-sectional views of the examples from the first example to the ninth example are shown in diagrams from FIG. 4A and FIG. 4B to FIG. 12A and FIG. 12B respectively. In diagrams from FIGS. 4A and 4B to FIGS. 12A and 12B, FIG. 4A, FIG. 5A, FIG. 6A, ..., FIG. 12A are cross-sectional views at the time of focusing at an object at infinity, and FIG. 4B, FIG. 5B, FIG. 6B ..., FIG. 12B are lens cross-sectional views at the time of focusing at a near object. Moreover, a parallel and flat plate is denoted by C, and an image plane is denoted by I. The reflecting telescope optical system according to each example is used in an interchangeable lens system, and is also a small-size reflecting telescope optical system which enables video photography.

Figure 4A:
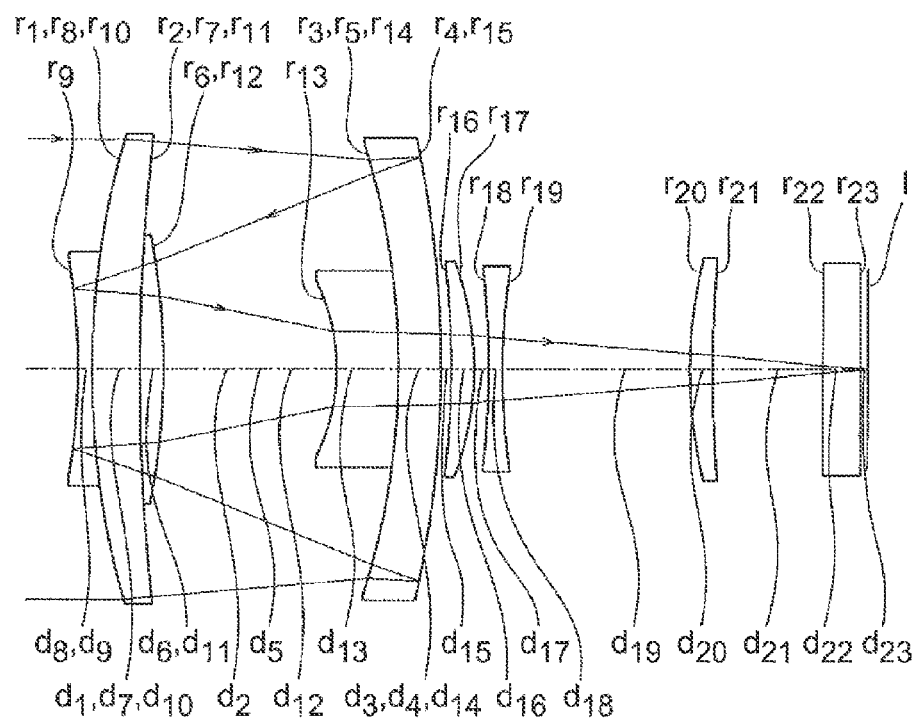
FIG. 4A and FIG. 4B are lens cross-sectional views of a reflecting telescope optical system according to a first example of the present invention, where.
Figure 4B:
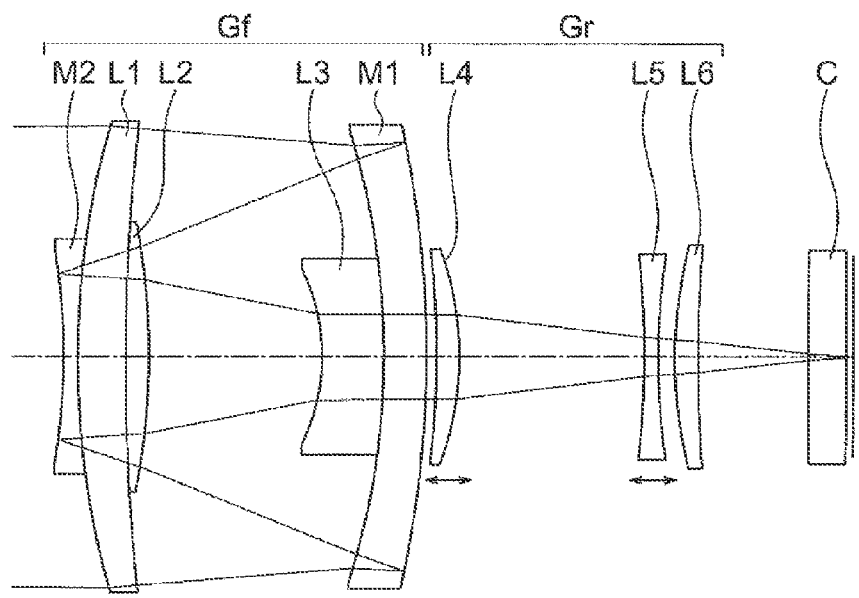

A reflecting telescope optical system according to the first example, as shown in FIG. 4A and FIG. 4B, includes in order from an object side, a front unit Gf and a rear unit Gr. The optical system according to the first example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a positive meniscus lens L4 having a convex surface directed toward the image side, a biconcave negative lens L5, and a positive meniscus lens L6 having a convex surface directed toward the object side. The rear unit Gr is disposed on the image side of the main reflecting mirror M1.

In the first example, the first operation and the second operation are carried out by different lens units. The biconcave negative lens L5 is the focusing lens unit Lf. At the time of focusing from a state of focused to an object at infinity to a near object, the biconcave negative lens L5 moves toward the image side. At the time of focusing, the front unit Gf, the positive meniscus lens L4, and the positive meniscus lens L6 are fixed (stationary).

The positive meniscus lens L4 is the wobbling lens unit Lw. After focusing by the biconcave negative lens L5, the positive meniscus lens L4 undergoes reciprocating movement which changes the focused state. At the time of wobbling, the front unit Gf, the biconcave negative lens L5, and the positive meniscus lens L6 are fixed (stationary).

Figure 5A:
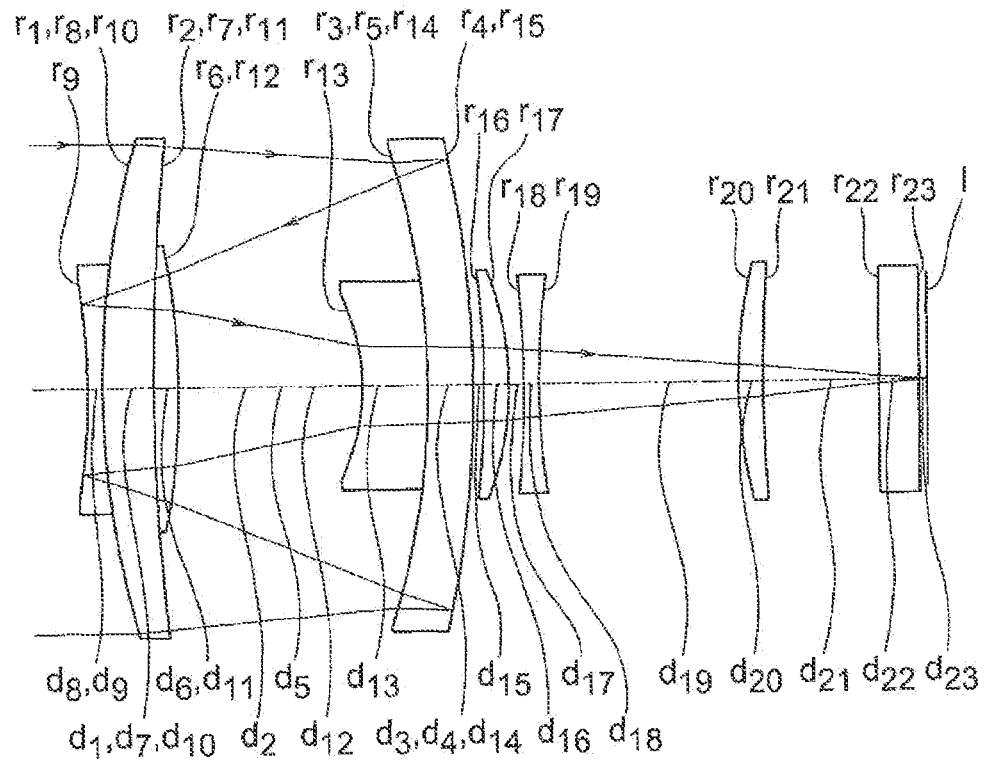
FIG. 5A and FIG. 5B are lens cross-sectional views of a reflecting telescope optical system according to a second example of the present invention, where.
Figure 5B:
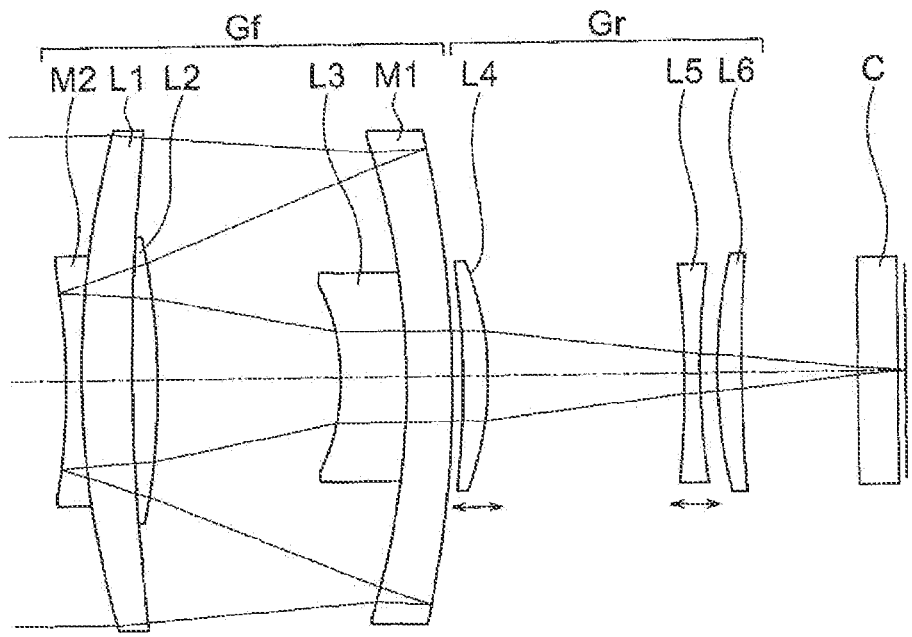

A reflecting telescope optical system according to the second example, as shown in FIG. 5A and FIG. 5B, includes in order from an object side, a front unit Gf and a rear unit Gr. The optical system according to the second example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a positive meniscus lens L4 having a convex surface directed toward the image side, a biconcave negative lens L5, and a positive meniscus lens L6 having a convex surface directed toward the object side. The rear unit Gr is disposed on the image side of the main reflecting mirror M1.

In the second example, the first operation and the second operation are carried out by different lens units. The biconcave negative lens L5 is the focusing lens unit Lf. At the time of focusing from a state of focused to an object at infinity to a near object, the biconcave negative lens L5 moves toward the image side. At the time of focusing, the front lens unit Gf, the positive meniscus lens L4, and the positive meniscus lens L6 are fixed (stationary).

The positive meniscus lens L4 is the wobbling lens unit Lw. After focusing by the biconcave negative lens L5, the positive meniscus lens L4 undergoes reciprocating movement which changes the focused state. At the time of wobbling, the front unit Gf, the biconcave negative lens L5, and the positive meniscus lens L6 are fixed (stationary).

Figure 6A:
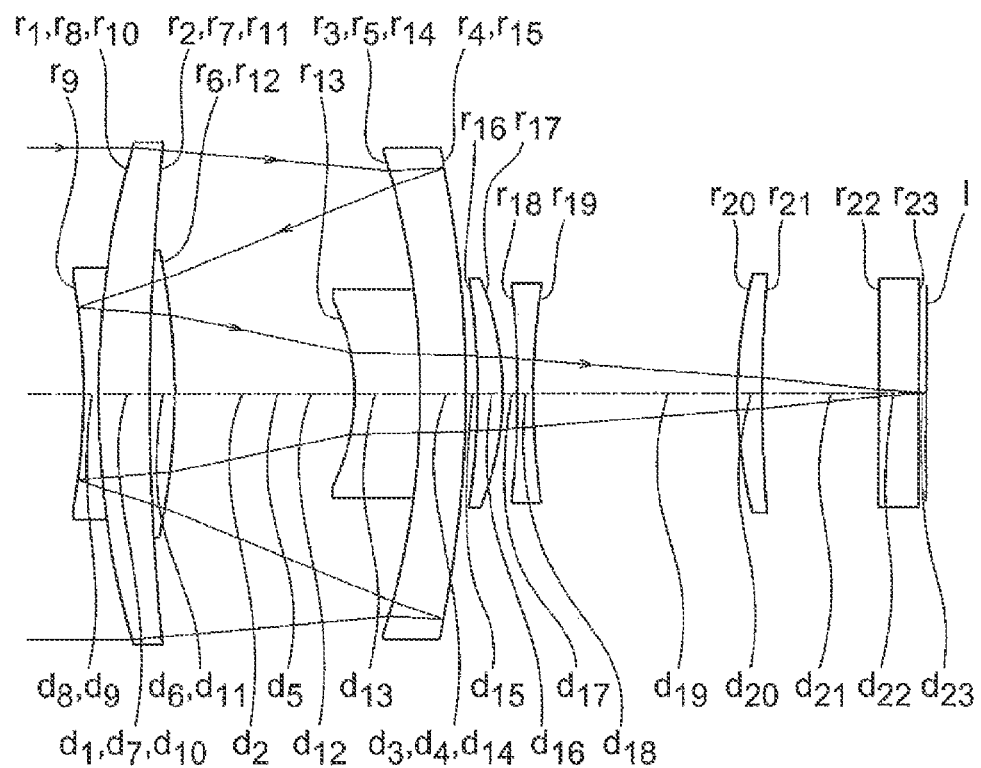
FIG. 6A and FIG. 6B are lens cross-sectional views of a reflecting telescope optical system according to a third example of the present invention, where.
Figure 6B:
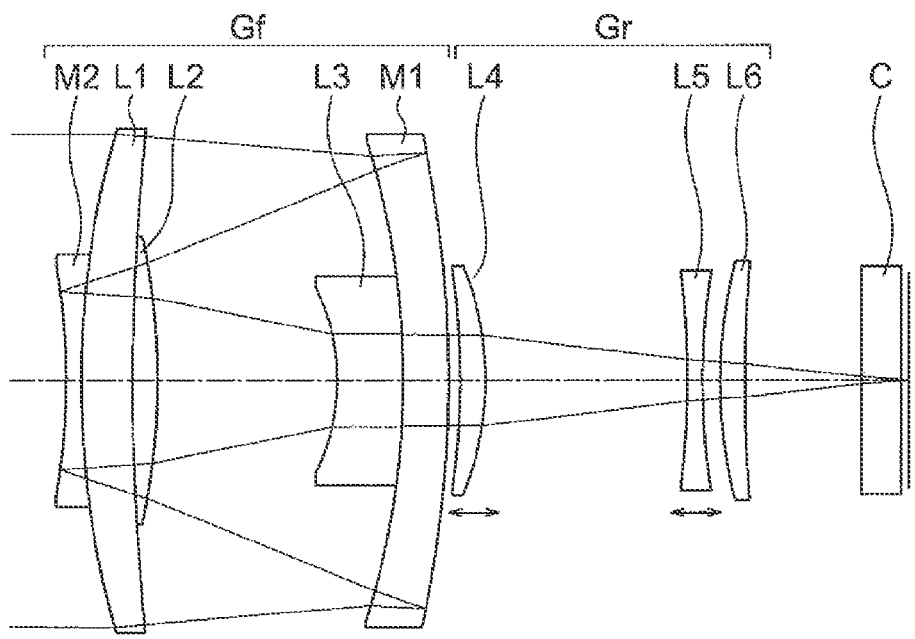

A reflecting telescope optical system according to the third example, as shown in FIG. 6A and FIG. 6B, includes in order from an object side, a front unit Gf and a rear unit Gr. The optical system according to the third example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a positive meniscus lens L4 having a convex surface directed toward the image side, a biconcave negative lens L5, and a positive meniscus lens L6 having a convex surface directed toward the object side. The rear unit Gr is disposed on the image side of the main reflecting mirror M1.

In the third example, the first operation and the second operation are carried out by different lens units. The biconcave negative lens L5 is the focusing lens unit Lf. At the time of focusing from a state of focused to an object at infinity to a near object, the biconcave negative lens L5 moves toward the image side. At the time of focusing, the front unit Gf, the positive meniscus lens L4, and the positive meniscus lens L6 are fixed (stationary).

The positive meniscus lens L4 is the wobbling lens unit Lw. After focusing by the biconcave negative lens L5, the positive meniscus lens L4 undergoes reciprocating movement which changes the focused state. At the time of wobbling, the front unit Gf, the biconcave negative lens L5, and the positive meniscus lens L6 are fixed (stationary).

Figure 7A:
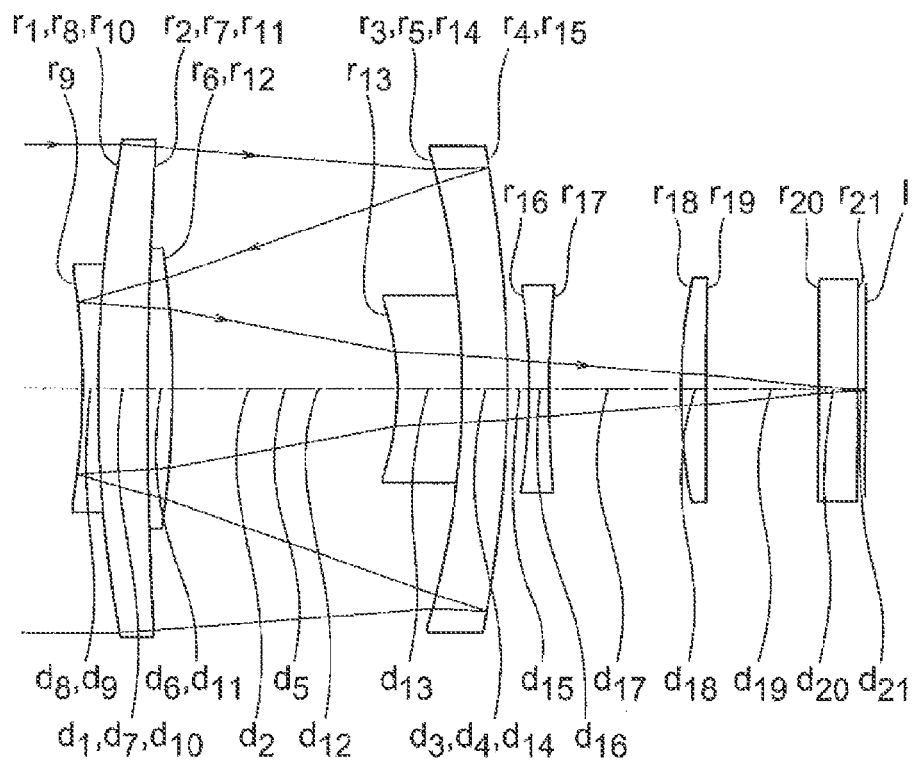
FIG. 7A and FIG. 7B are lens cross-sectional views of a reflecting telescope optical system according to a fourth example of the present invention, where.
Figure 7B:
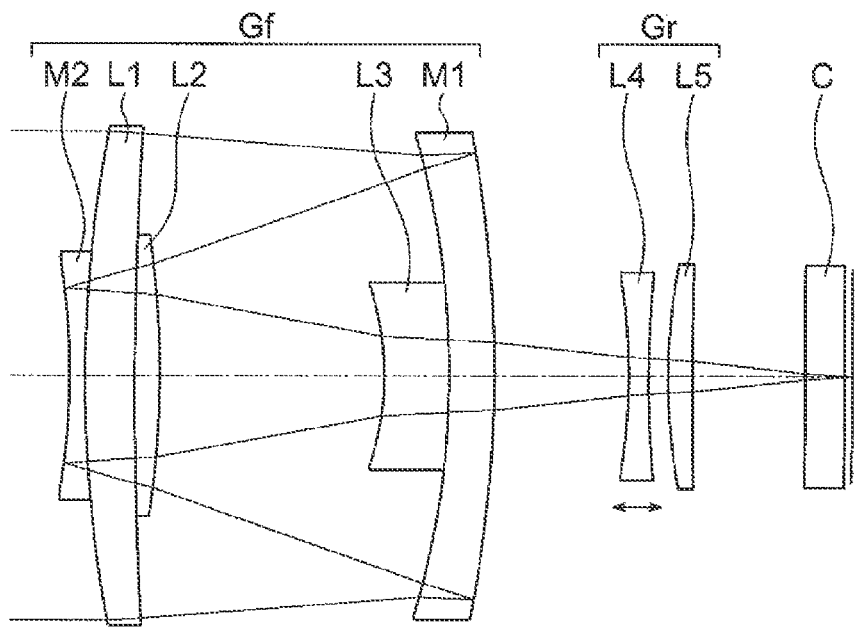

A reflecting telescope optical system according to the fourth example, as shown in FIG. 7A and FIG. 7B, includes in order from an object side, a front unit Gf and a rear unit Gr. The optical system according to the fourth example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a biconcave negative lens L4, and a positive meniscus lens L5 having a convex surface directed toward the object side. The rear unit Gr is disposed on the image side of the main reflecting mirror M1.

In the fourth example, the first operation and the second operation are carried out by one lens unit Lfw. The biconcave negative lens L4 is the lens unit Lfw. At the time of focusing from a state of focused to an object at infinity to a near object, the biconcave negative lens L4 moves toward the image side. Moreover, after focusing by the biconcave negative lens L4, the biconcave negative lens L4 undergoes reciprocating movement which changes the focused state. At the time of focusing and at the time of wobbling, the front unit Gf and the positive meniscus lens L5 are fixed (stationary).

Figure 8A:
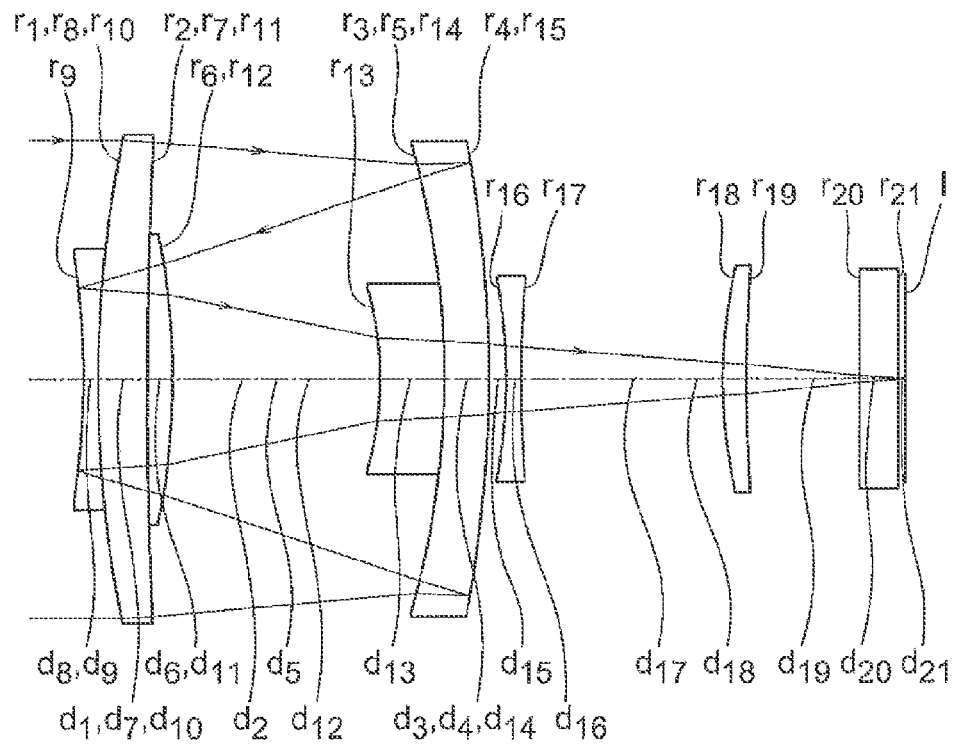
FIG. 8A and FIG. 8B are lens cross-sectional views of a reflecting telescope optical system according to a fifth example of the present invention, where.
Figure 8B:
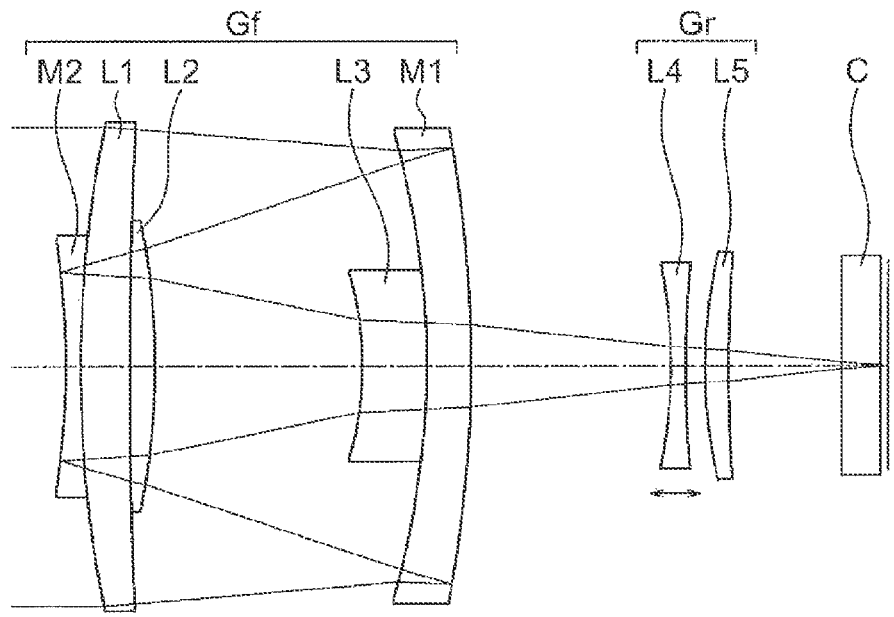

A reflecting telescope optical system according to the fifth example, as shown in FIG. 8A and FIG. 8B, includes in order from an object side, a front unit Gf and a rear unit Gr. The optical system according to the fifth example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a biconcave negative lens L4, and a positive meniscus lens L5 having a convex surface directed toward the object side. The rear unit Gr is disposed on the image side of the main reflecting mirror M1.

In the fifth example, the first operation and the second operation are carried out by one lens unit Lfw. The biconcave negative lens L4 is the lens unit Lfw. At the time of focusing from a state of focused to an object at infinity to a near object, the biconcave negative lens L4 moves toward the image side. Moreover, after focusing by the biconcave negative lens L4, the biconcave negative lens L4 undergoes reciprocating movement which changes the focused state. At the time of focusing and at the time of wobbling, the front unit Gf and the positive meniscus lens L5 are fixed (stationary).

Figure 9A:
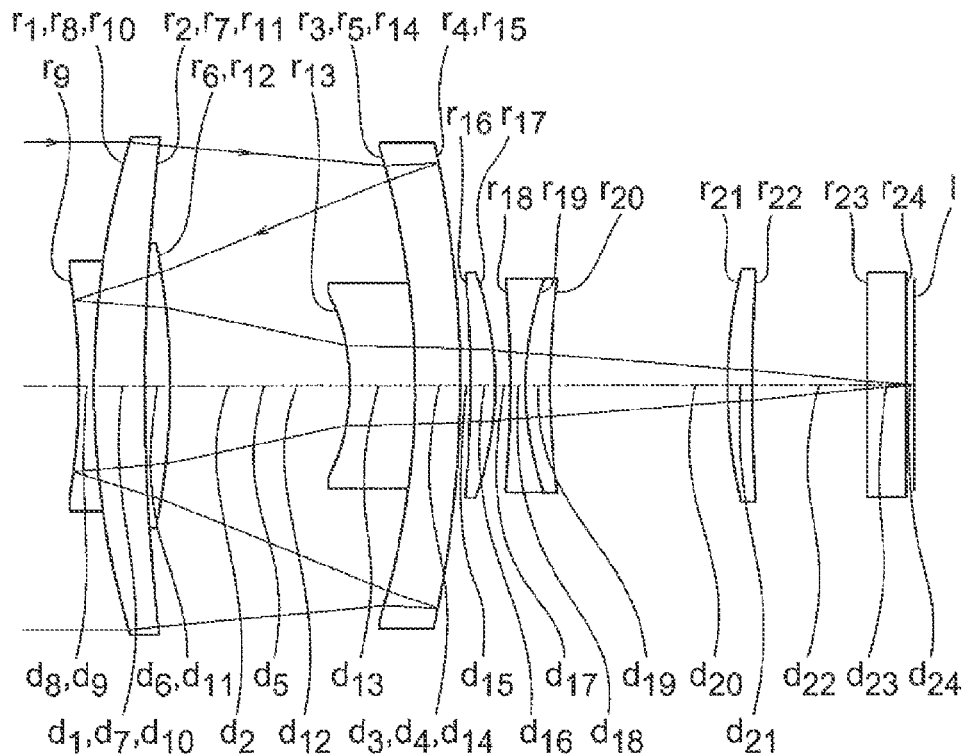
FIG. 9A and FIG. 9B are lens cross-sectional views of a reflecting telescope optical system according to a sixth example of the present invention, where.
Figure 9B:
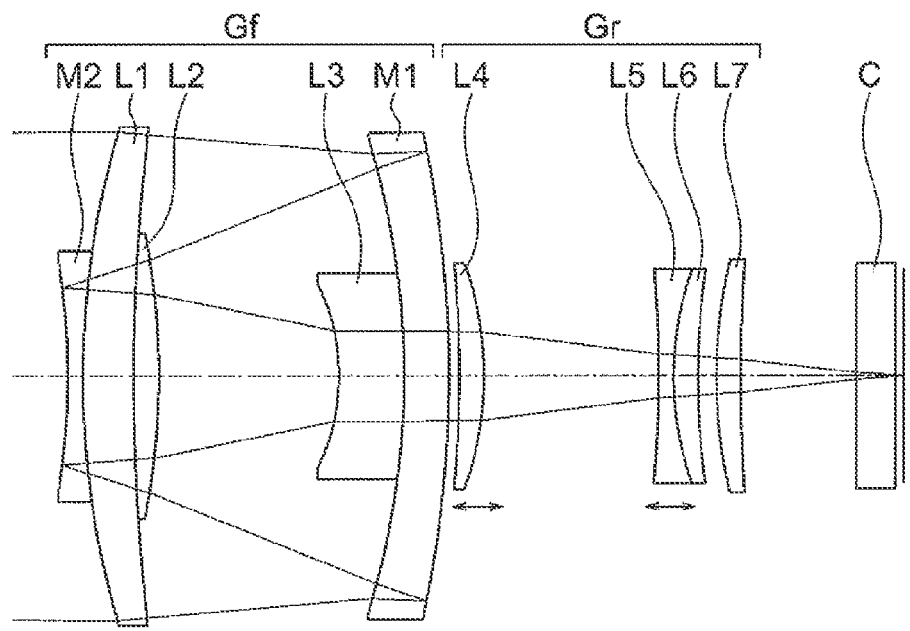

A reflecting telescope optical system according to the sixth example, as shown in FIG. 9A and FIG. 9B, includes in order from an object side, a front unit Gf and a rear unit Gr. The optical system according to the sixth example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a positive meniscus lens L4 having a convex surface directed toward an image side, a biconcave negative lens L5, a positive meniscus lens L6 having a convex surface directed toward the object side, and a positive meniscus lens L7 having a convex surface directed toward the object side. Here, the biconcave negative lens L5 and the positive meniscus lens L6 are cemented. The rear unit Gr is disposed on the image side of the main reflecting mirror M1.

In the sixth example, the first operation and the second operation are carried out by different lens units. A cemented lens (of the biconcave negative lens L5 and the positive meniscus lens L6) is the focusing lens unit Lf. At the time of focusing from a state of focused to an object at infinity to a near object, the cemented lens moves toward the image side. At the time of focusing, the front unit Gf, the positive meniscus lens L4, and the positive meniscus lens L7 are fixed (stationary).

The positive meniscus lens L4 is the wobbling lens unit Lw. After focusing by the cemented lens, the positive meniscus lens L4 undergoes reciprocating movement which changes the focused state. At the time of wobbling, the front unit Gf, the cemented lens, and the positive meniscus lens L7 are fixed (stationary).

Figure 10A:
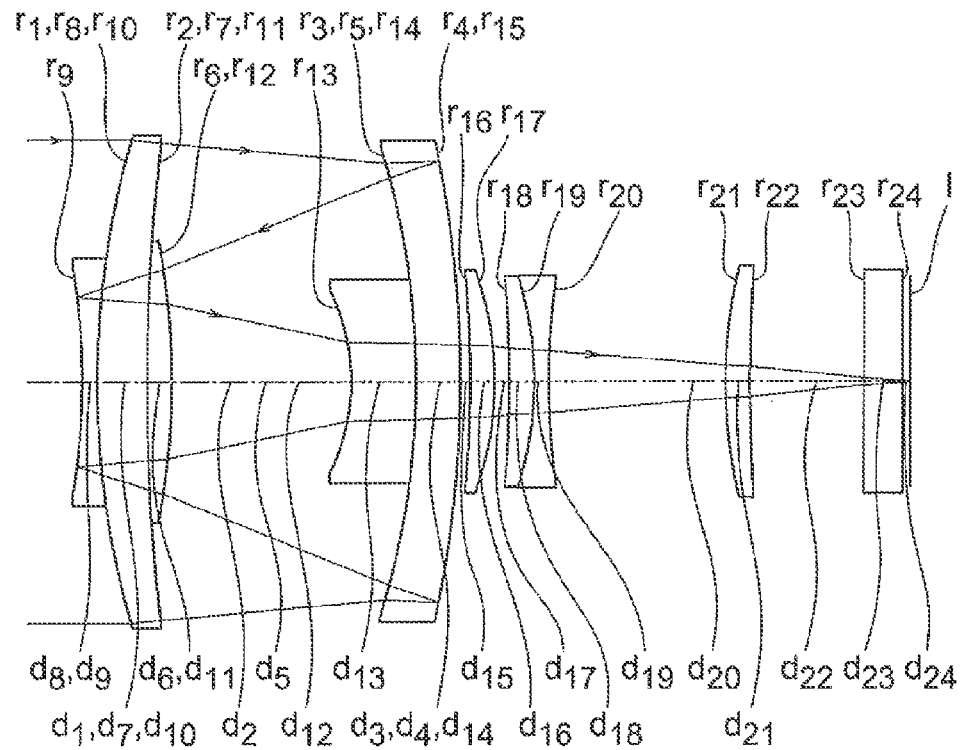
FIG. 10A and FIG. 10B are lens cross-sectional views of a reflecting telescope optical system according to a seventh example of the present invention, where.
Figure 10B:
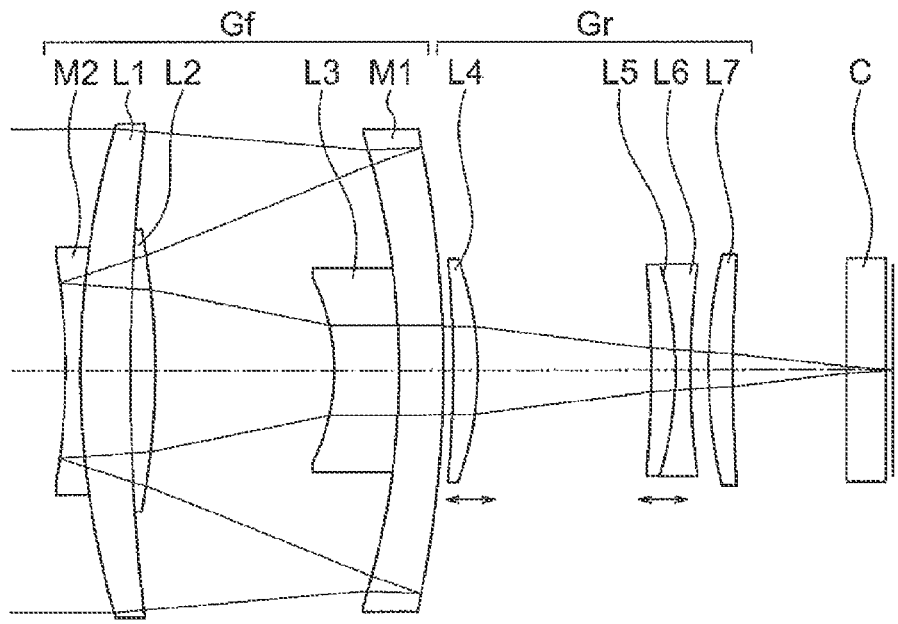

A reflecting telescope optical system according to the seventh example, as shown in FIG. 10A and FIG. 10B, includes in order from an object side, a front unit Gf and a rear unit Gr.

The optical system according to the seventh example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a positive meniscus lens L4 having a convex surface directed toward the image side, a positive meniscus lens L5 having a convex surface directed toward the image side, a biconcave negative lens L6, and a positive meniscus lens L7 having a convex surface directed toward the object side. Here, the positive meniscus lens L5 and the biconcave negative lens L6 are cemented. The rear unit Gr is disposed on the image side of the first reflecting mirror M1.

In the seventh example, the first operation and the second operation are carried out by different lens units. A cemented lens (of the positive meniscus lens L5 and the biconcave negative lens L6) is the focusing lens unit Lf. At the time of focusing from a state of focused to an object at infinity to a near object, the cemented lens moves toward the image side. At the time of focusing, the front unit Gf, the positive meniscus lens L4, and the positive meniscus lens L7 are fixed (stationary).

The positive meniscus lens L4 is the wobbling lens unit Lw. After focusing by the cemented lens, the positive meniscus lens L4 undergoes reciprocating movement which changes the focusing state. At the time of wobbling, the front unit Gf, the cemented lens, and the positive meniscus lens L7 are fixed (stationary).

Figure 11A:
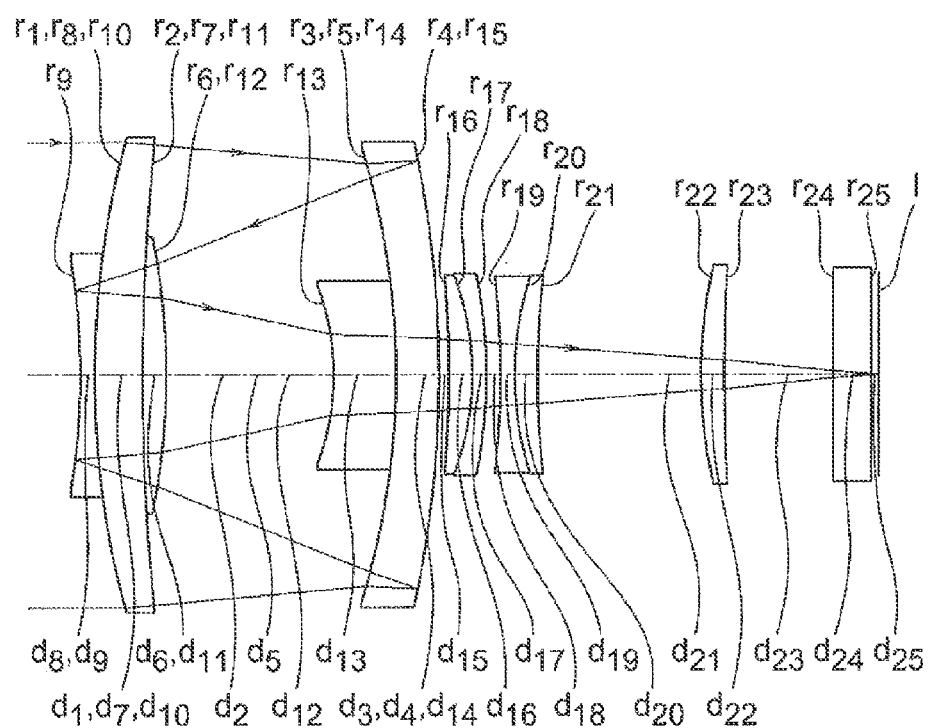
FIG. 11A and FIG. 11B are lens cross-sectional views of a reflecting telescope optical system according to an eighth example of the present invention, where.
Figure 11B:
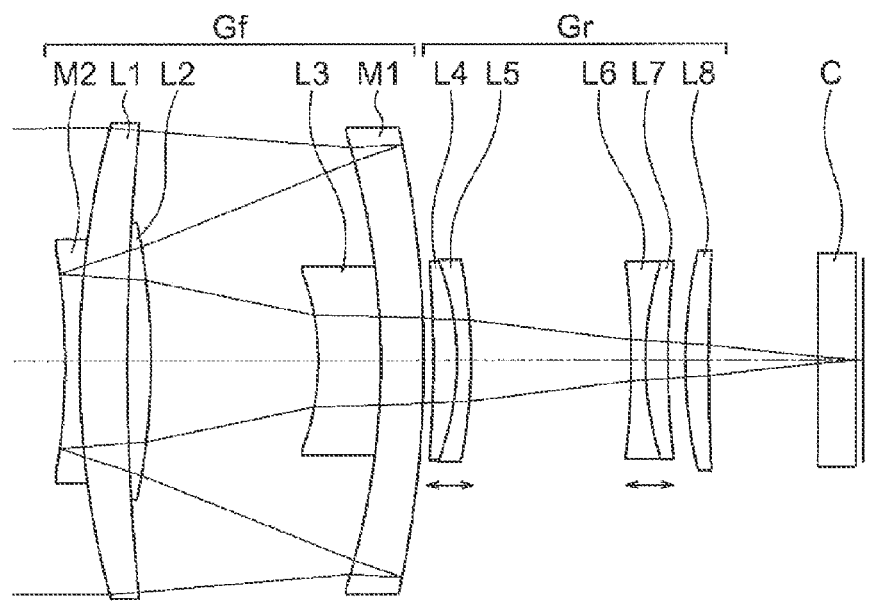
Figure 12A:
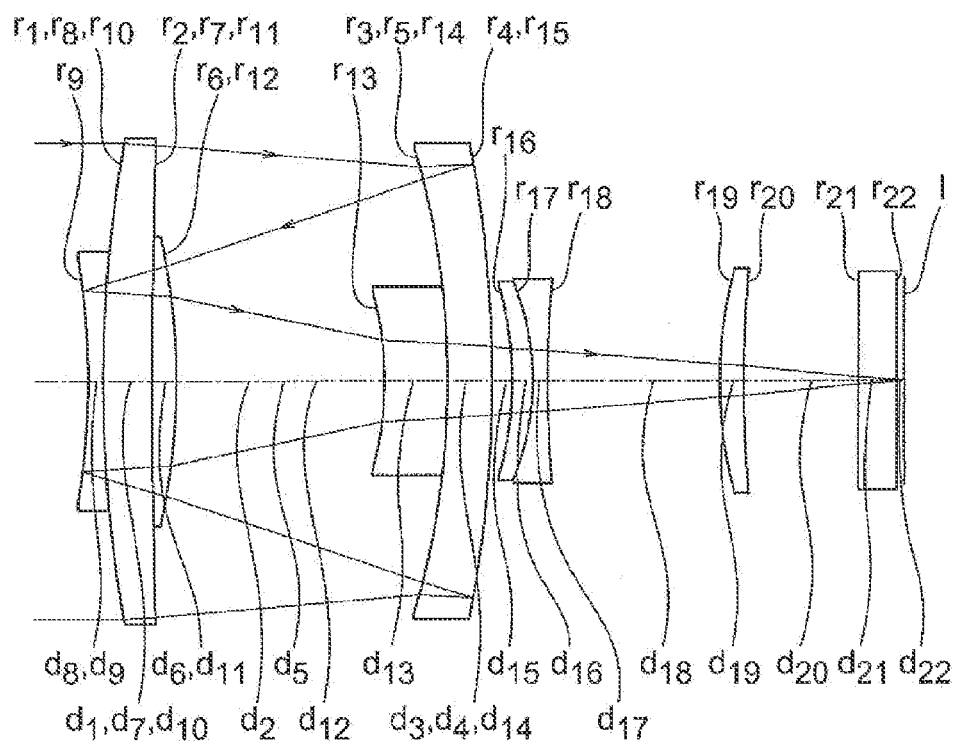
FIG. 12A and FIG. 12B are lens cross-sectional views of a reflecting telescope optical system according to a ninth example of the present invention, where.
Figure 12B:
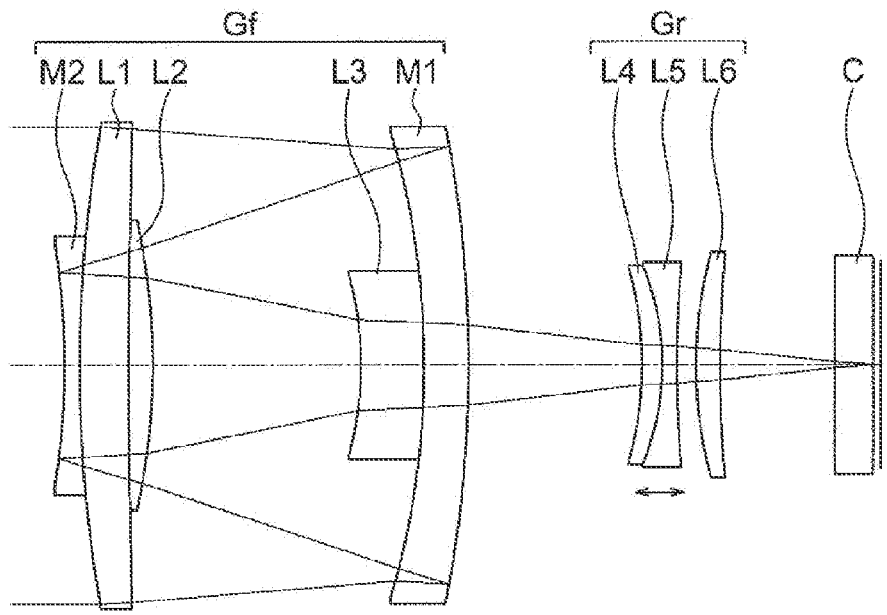
Figures 13A, 13B, 13C, 13D:
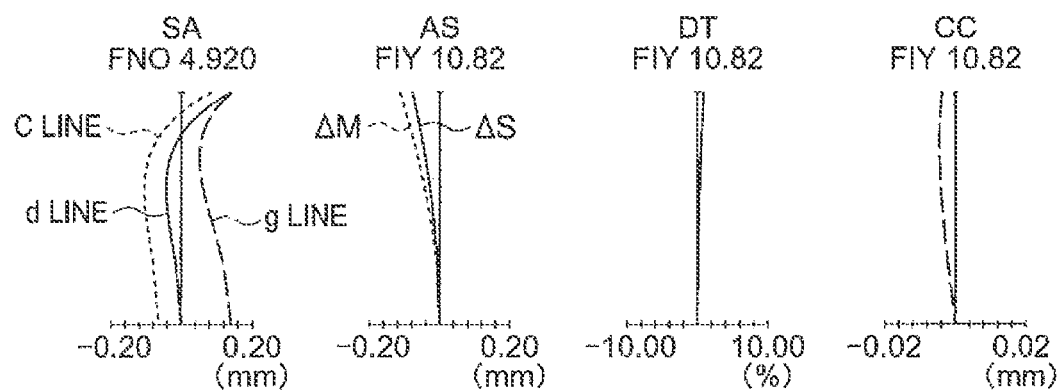
FIG. 13A, FIG. 13B, FIG. 13C, FIG. 13D, FIG. 13E, FIG. 13F, FIG. 13G, and FIG. 13H (hereinafter, 'FIG. 13A to FIG. 13H') are aberration diagrams of the reflecting telescope optical system according to the first example, and are aberration diagrams of two different focused states.
Figures 13E, 13F, 13G, 13H:
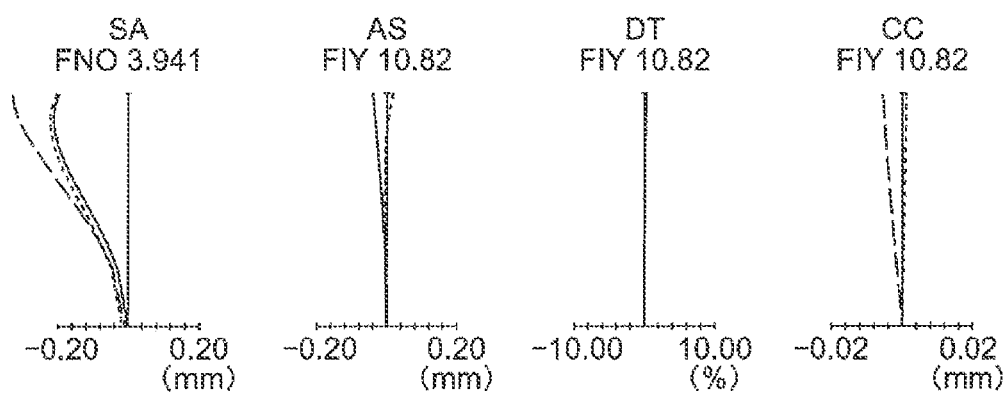
Figures 15A, 15B, 15C, 15D:
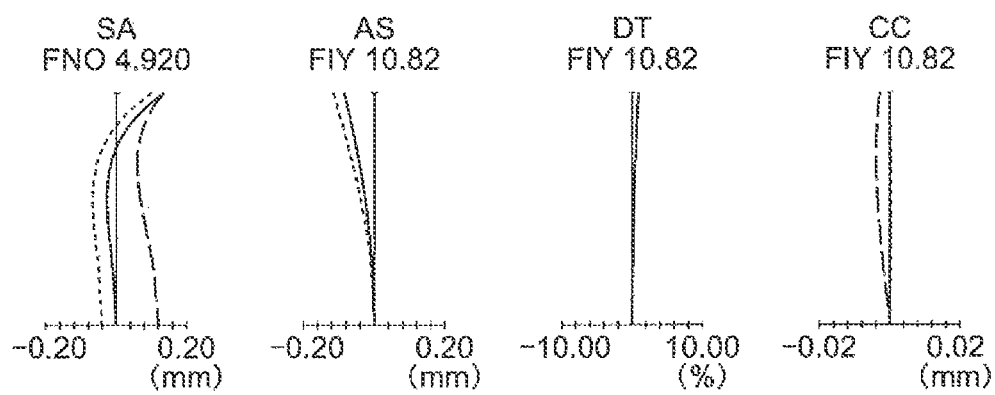
FIG. 15A, FIG. 15B, FIG. 15C, FIG. 15D, FIG. 15E, FIG. 15F, FIG. 15G, and FIG. 15H (hereinafter, 'FIG. 15A to FIG. 15H') are aberration diagrams of the reflecting telescope optical system according to the third example, and are aberration diagrams of two different focused states.
Figures 15E, 15F, 15G, 15H:
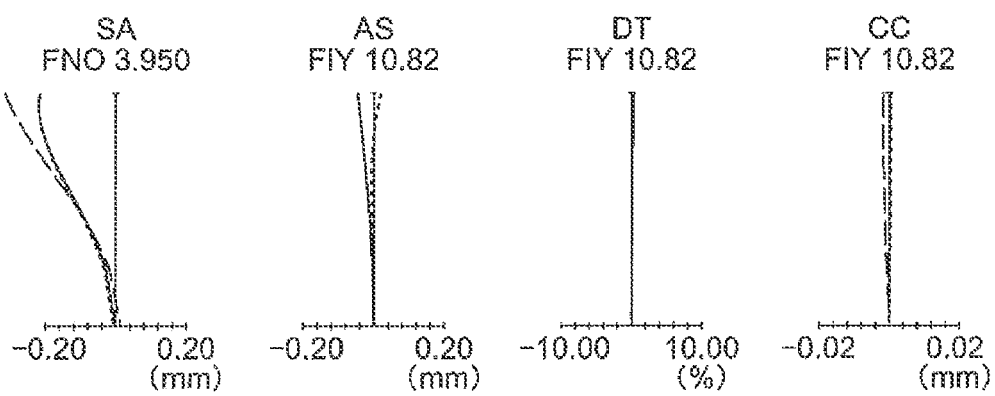
Figures 19A, 19B, 19C, 19D:
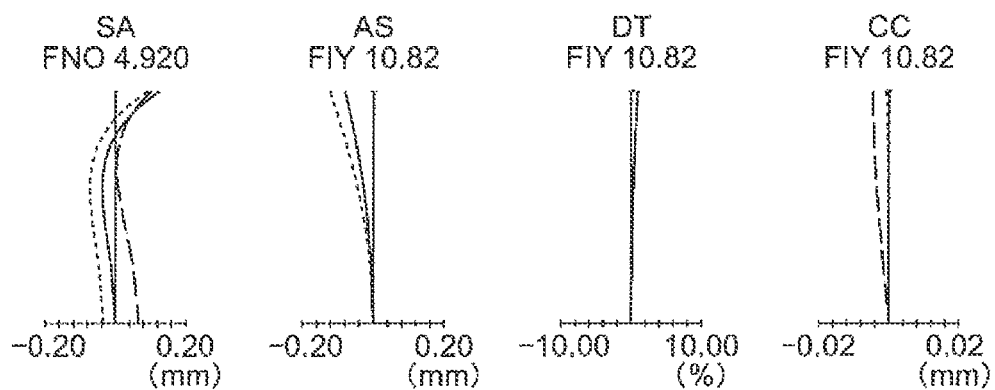
FIG. 19A, FIG. 19B, FIG. 19C, FIG. 19D, FIG. 19E, FIG. 19F, FIG. 19G, and FIG. 19H (hereinafter, 'FIG. 19A to FIG. 19H') are aberration diagrams of the reflecting telescope optical system according to the seventh example, and are aberration diagrams of two different focused states.
Figures 19E, 19F, 19G, 19H:
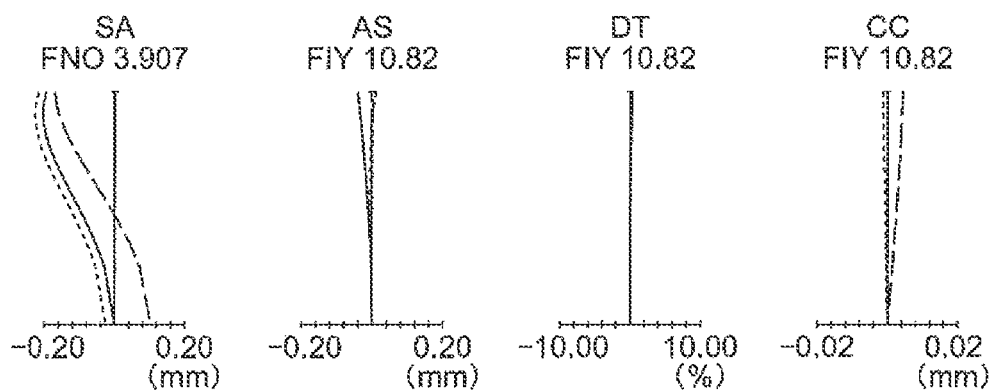

A reflecting telescope optical system according to the eighth example, as shown in FIG. 11A and FIG. 11B, includes in order from an object side, a front unit Gf and a rear unit Gr. The optical system according to the eighth example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a positive meniscus lens L4 having a convex surface directed toward the image side, a negative meniscus lens L5 having a convex surface directed toward the image side, a biconcave negative lens L6, a positive meniscus lens L7 having a convex surface directed toward the object side, and a positive meniscus lens L8 having a convex surface directed toward the object side. Here, the positive meniscus lens L4 and the negative meniscus lens L5 are cemented. Moreover, the biconcave negative lens L6 and the positive meniscus lens L7 are cemented. The rear unit Gr is disposed on the image side of the main reflecting mirror M1.

In the eighth example, the first operation and the second operation are carried out by different lens units. A cemented lens (of the biconcave negative lens L6 and the positive meniscus lens L7) on the image side is the focusing lens unit Lf. At the time of focusing from a state of focused to an object at infinity to a near object, the cemented lens on the image side moves toward the image side. At the time of focusing, the front unit Gf, a cemented lens on the object side, and the positive meniscus lens L8 are fixed (stationary).

The cemented lens (of the positive meniscus lens L4 and the negative meniscus lens L5) on the object side is the wobbling lens unit Lw. After focusing by the cemented lens on the image side, the cemented lens on the object side undergoes reciprocating movement which changes the focused state. At the time of wobbling, the front unit Gf, the cemented lens on the image side, and the positive meniscus lens L8 are fixed (stationary).

A reflecting telescope optical system according to the ninth example, as shown in FIG. 12A and FIG. 12B, includes in order from an object side, a front unit Gf and a rear unit Gr. The optical system according to the ninth example is a 250 mm reflecting telescope optical system with a 35 mm equivalent focal length.

The front unit Gf includes in order from the object side, a sub reflecting mirror M2 having a biconcave shape, a positive meniscus lens L1 having a convex surface directed toward the object side, a biconvex positive lens L2, a negative meniscus lens L3 having a convex surface directed toward an image side, and a main reflecting mirror M1 having a meniscus shape which is convex toward the image side.

The sub reflecting mirror M2 is cemented to an object-side surface of the positive meniscus lens L1, and the biconvex positive lens L2 is cemented to an image-side surface of the positive meniscus lens L1. Moreover, the negative meniscus lens L3 is cemented to an object-side surface of the main reflecting mirror M1.

The main reflecting mirror M1 and the sub reflecting mirror M2 are disposed such that, a reflecting surface of the main reflecting mirror M1 and a reflecting surface of the sub reflecting mirror M2 are mutually facing. Moreover, the reflecting surface of the main reflecting mirror M1 is a concave surface, and a reflecting area is formed to be ring-shaped. Moreover, both the main reflecting mirror M1 and the sub reflecting mirror M2 are back-surface mirrors.

The rear unit Gr includes in order from the object side, a positive meniscus lens L4 having a convex surface directed toward the image side, a biconcave negative lens L5, and a positive meniscus lens L6 having a convex surface directed toward the object side. Here, the positive meniscus lens L4 and the biconcave negative lens L5 are cemented. The rear unit Gr is disposed on the image side of the main reflecting mirror M1.

In the ninth example, the first operation and the second operation are carried out by one lens unit Lfw. A cemented lens (of the positive meniscus lens L4 and the biconcave negative lens L5) is the lens unit Lfw. At the time of focusing from a state of focused to an object at infinity to a near object, the cemented lens moves to the image side. Moreover, after focusing by the cemented lens, the cemented lens undergoes reciprocating movement which changes the focused state. At the time of focusing and at the time of wobbling, the front unit Gf and the positive meniscus lens L6 are fixed (stationary).

Numerical data of each example described above is shown below. Apart from symbols described above, r denotes radius of curvature of each lens surface, d denotes a distance between respective lens surfaces, nd denotes a refractive index of each lens for a d-line, and vd denotes an Abbe number for each lens. Further, a focal length denotes a focal length of the entire system, FNO. denotes an F number, angle of view denotes a half angle of view, and fb denotes a back focus. Further, fb (back focus) is a unit which is expressed upon air conversion of a distance from the lens backmost surface to a paraxial image surface.

Regarding focus data, inf indicates data when focused at infinity, or at an object at infinity, 8 m indicates data when focused at an object when a distance between an object and an image becomes 8 m, and 4 m indicates data when focused at an object when a distance between an object and an image becomes 4 m. As a state of focused to a near object, a state when the distance between an object and an image is 4 m is available.

Example 1

| Unit mm | | | | |
|---|---|---|---|---|
| Surface data | | | | |
| Surface no. | r | d | nd | vd |
| Object plane | ∞ | ∞ | | |
| 1 | 93.607 | 5.05 | 1.52249 | 59.84 |
| 2 | 227.664 | 27.65 | | |
| 3 | −82.129 | 4.56 | 1.60562 | 43.70 |
| 4(RS) | −116.567 | −4.56 | 1.60562 | 43.70 |
| 5 | −82.129 | −25.11 | | |
| 6 | −77.280 | −2.54 | 1.69895 | 30.13 |
| 7 | 227.664 | −5.05 | 1.52249 | 59.84 |
| 8 | 93.607 | −1.52 | 1.54814 | 45.79 |
| 9(RS) | −71.166 | 1.52 | 1.54814 | 45.79 |
| 10 | 93.607 | 5.05 | 1.52249 | 59.84 |
| 11 | 227.664 | 2.54 | 1.69895 | 30.13 |
| 12 | −77.280 | 18.51 | | |
| 13 | −21.965 | 6.60 | 1.84666 | 23.78 |
| 14 | −82.129 | 4.56 | 1.60562 | 43.70 |
| 15 | −116.567 | Variable | | |
| 16 | −97.191 | 2.50 | 1.83481 | 42.73 |
| 17 | −32.801 | Variable | | |
| 18 | −99.058 | 1.50 | 1.63854 | 55.38 |
| 19 | 74.447 | Variable | | |
| 20 | 50.688 | 2.50 | 1.84666 | 23.78 |
| 21 | 156.402 | 11.72 | | |
| 22 | ∞ | 4.00 | 1.51633 | 64.14 |
| 23 | ∞ | 0.80 | | |
| Image plane | ∞ | | | |

| Unit mm | |
|---|---|
| Various data | |
| Focal length | 245.00 |
| FNO. | 4.92 |
| Angle of view | 5.01 |
| Image height | 10.82 |
| fb (in air) | 15.15 |
| Front unit focal length | 347.28 |
| Rear unit focal length | 76.74 |

| Focus data | | | |
|---|---|---|---|
| | inf | 8 m | 4 m |
| d15 | 1.08 | 1.08 | 1.08 |
| d17 | 1.50 | 9.43 | 19.82 |
| d19 | 20.08 | 12.15 | 1.77 |

Example 2

| Unit mm | | | | |
|---|---|---|---|---|
| Surface data | | | | |
| Surface no. | r | d | nd | vd |
| Object plane | ∞ | ∞ | | |
| 1 | 94.291 | 5.05 | 1.52249 | 59.84 |
| 2 | 228.886 | 27.65 | | |
| 3 | −81.529 | 4.56 | 1.60562 | 43.70 |
| 4 (RS) | −116.035 | −4.56 | 1.60562 | 43.70 |
| 5 | −81.529 | −25.11 | | |
| 6 | −75.569 | −2.54 | 1.69895 | 30.13 |
| 7 | 228.886 | −5.05 | 1.52249 | 59.84 |
| 8 | 94.291 | −1.52 | 1.54814 | 45.79 |
| 9 (RS) | −70.480 | 1.52 | 1.54814 | 45.79 |
| 10 | 94.291 | 5.05 | 1.52249 | 59.84 |
| 11 | 228.886 | 2.54 | 1.69895 | 30.13 |
| 12 | −75.569 | 18.51 | | |
| 13 | −21.858 | 6.60 | 1.84666 | 23.78 |
| 14 | −81.529 | 4.56 | 1.60562 | 43.70 |
| 15 | −116.035 | Variable | | |
| 16 | −94.327 | 2.50 | 1.83481 | 42.73 |
| 17 | −32.483 | Variable | | |
| 18 | −101.385 | 1.50 | 1.64850 | 53.02 |
| 19 | 75.056 | Variable | | |
| 20 | 50.791 | 2.50 | 1.84666 | 23.78 |
| 21 | 157.597 | 11.71 | | |
| 22 | ∞ | 4.00 | 1.51633 | 64.14 |
| 23 | ∞ | 0.80 | | |
| Image plane | ∞ | | | |

| Unit mm | |
|---|---|
| Various data | |
| Focal length | 245.00 |
| FNO. | 4.92 |
| Angle of view | 5.01 |
| Image height | 10.82 |
| fb (in air) | 15.15 |
| Front unit focal length | 346.83 |
| Rear unit focal length | 76.76 |

| Focus data | | | |
|---|---|---|---|
| | inf | 8 m | 4 m |
| d15 | 1.09 | 1.09 | 1.09 |
| d17 | 1.50 | 9.43 | 19.81 |
| d19 | 20.08 | 12.15 | 1.77 |

Example 3

Unit mm

Surface data

| Surface no. | r | d | nd | vd |
|---|---|---|---|---|
| Object plane | ∞ | ∞ | | |
| 1 | 94.744 | 5.05 | 1.56384 | 60.67 |
| 2 | 227.808 | 27.19 | | |
| 3 | −81.833 | 4.56 | 1.60562 | 43.70 |
| 4 (RS) | −116.782 | −4.56 | 1.60562 | 43.70 |
| 5 | −81.833 | −24.65 | | |
| 6 | −72.719 | −2.54 | 1.68893 | 31.07 |
| 7 | 227.808 | −5.05 | 1.56384 | 60.67 |
| 8 | 94.744 | −1.52 | 1.54814 | 45.79 |
| 9 (RS) | −70.079 | 1.52 | 1.54814 | 45.79 |
| 10 | 94.744 | 5.05 | 1.56384 | 60.67 |
| 11 | 227.808 | 2.54 | 1.68893 | 31.07 |
| 12 | −72.719 | 18.05 | | |
| 13 | −21.169 | 6.60 | 1.84666 | 23.78 |
| 14 | −81.833 | 4.56 | 1.60562 | 43.70 |
| 15 | −116.782 | Variable | | |
| 16 | −79.605 | 2.50 | 1.83481 | 42.71 |
| 17 | −30.607 | Variable | | |
| 18 | −89.086 | 1.50 | 1.58913 | 61.14 |
| 19 | 72.756 | Variable | | |
| 20 | 50.084 | 2.50 | 1.84666 | 23.78 |
| 21 | 149.500 | 11.74 | | |
| 22 | ∞ | 4.00 | 1.51633 | 64.14 |
| 23 | ∞ | 0.80 | | |
| Image plane | ∞ | | | |

Various data

| | |
|---|---|
| Focal length | 245.00 |
| FNO. | 4.92 |
| Angle of view | 5.01 |
| Image height | 10.82 |
| fb (in air) | 15.17 |
| Front unit focal length | 351.33 |
| Rear unit focal length | 75.57 |

Focus data

| | inf | 8 m | 4 m |
|---|---|---|---|
| d15 | 1.17 | 1.17 | 1.17 |
| d17 | 1.50 | 9.56 | 20.16 |
| d19 | 20.43 | 12.38 | 1.77 |

Example 4

Unit mm

Surface data

| Surface no. | r | d | nd | vd |
|---|---|---|---|---|
| Object plane | ∞ | ∞ | | |
| 1 | 133.623 | 5.05 | 1.60311 | 60.64 |
| 2 | 437.917 | 31.76 | | |
| 3 | −87.803 | 4.56 | 1.54814 | 45.79 |
| 4 (RS) | −130.398 | −4.56 | 1.54814 | 45.79 |
| 5 | −87.803 | −29.22 | | |
| 6 | −100.811 | −2.54 | 1.80400 | 46.57 |
| 7 | 437.917 | −5.05 | 1.60311 | 60.64 |
| 8 | 133.623 | −1.52 | 1.48749 | 70.23 |
| 9 (RS) | −76.945 | 1.52 | 1.48749 | 70.23 |
| 10 | 133.623 | 5.05 | 1.60311 | 60.64 |
| 11 | 437.917 | 2.54 | 1.80400 | 46.57 |
| 12 | −100.811 | 22.62 | | |
| 13 | −28.781 | 6.60 | 1.63980 | 34.46 |
| 14 | −87.803 | 4.56 | 1.54814 | 45.79 |
| 15 | −130.398 | Variable | | |
| 16 | −64.467 | 2.00 | 1.49700 | 81.54 |
| 17 | 111.549 | Variable | | |
| 18 | 60.073 | 2.50 | 1.83400 | 37.16 |
| 19 | 791.887 | 11.37 | | |
| 20 | ∞ | 4.00 | 1.51633 | 64.14 |
| 21 | ∞ | 0.80 | | |
| Image plane | ∞ | | | |

Various data

| | |
|---|---|
| Focal length | 245.00 |
| FNO. | 4.92 |
| Angle of view | 5.02 |
| Image height | 10.82 |
| fb (in air) | 14.81 |
| Front unit focal length | 217.69 |
| Rear unit focal length | 351.27 |

Focus data

| | inf | 8 m | 4 m |
|---|---|---|---|
| d15 | 2.21 | 7.31 | 13.55 |
| d17 | 13.34 | 8.24 | 2.00 |

Example 5

Unit mm

Surface data

| Surface no. | r | d | nd | vd |
|---|---|---|---|---|
| Object plane | ∞ | ∞ | | |
| 1 | 131.388 | 5.05 | 1.58913 | 61.14 |
| 2 | 568.463 | 30.48 | | |
| 3 | −88.881 | 4.56 | 1.61772 | 49.81 |
| 4 (RS) | −133.794 | −4.56 | 1.61772 | 49.81 |
| 5 | −88.881 | −27.94 | | |
| 6 | −78.886 | −2.54 | 1.74400 | 44.78 |
| 7 | 568.463 | −5.05 | 1.58913 | 61.14 |
| 8 | 131.388 | −1.52 | 1.51823 | 58.90 |
| 9 (RS) | −85.123 | 1.52 | 1.51823 | 58.90 |
| 10 | 131.388 | 5.05 | 1.58913 | 61.14 |
| 11 | 568.463 | 2.54 | 1.74400 | 44.78 |
| 12 | −78.886 | 21.34 | | |
| 13 | −35.114 | 6.60 | 1.84666 | 23.78 |
| 14 | −88.881 | 4.56 | 1.61772 | 49.81 |
| 15 | −133.794 | Variable | | |
| 16 | −56.147 | 1.50 | 1.48749 | 70.23 |
| 17 | 123.642 | Variable | | |
| 18 | 52.188 | 2.50 | 1.84666 | 23.78 |
| 19 | 198.533 | 11.61 | | |
| 20 | ∞ | 4.00 | 1.51633 | 64.14 |
| 21 | ∞ | 0.80 | | |
| Image plane | ∞ | | | |

Various data

| | |
|---|---|
| Focal length | 245.00 |
| FNO. | 4.92 |
| Angle of view | 5.02 |
| Image height | 10.82 |
| fb (in air) | 15.05 |
| Front unit focal length | 200.73 |
| Rear unit focal length | 388.44 |

Example 6

Unit mm

Surface data

| Surface no. | r | d | nd | vd |
|---|---|---|---|---|
| Object plane | ∞ | ∞ | | |
| 1 | 91.476 | 5.05 | 1.56384 | 60.67 |
| 2 | 212.735 | 27.41 | | |
| 3 | −83.563 | 4.56 | 1.60562 | 43.70 |
| 4 (RS) | −118.829 | −4.56 | 1.60562 | 43.70 |
| 5 | −83.563 | −24.87 | | |
| 6 | −79.995 | −2.54 | 1.68893 | 31.07 |
| 7 | 212.735 | −5.05 | 1.56384 | 60.67 |
| 8 | 91.476 | −1.52 | 1.54814 | 45.79 |
| 9 (RS) | −74.291 | 1.52 | 1.54814 | 45.79 |
| 10 | 91.476 | 5.05 | 1.56384 | 60.67 |
| 11 | 212.735 | 2.54 | 1.68893 | 31.07 |
| 12 | −79.995 | 18.27 | | |
| 13 | −21.576 | 6.60 | 1.84666 | 23.78 |
| 14 | −83.563 | 4.56 | 1.60562 | 43.70 |
| 15 | −118.829 | Variable | | |
| 16 | −116.941 | 2.50 | 1.83481 | 42.73 |
| 17 | −33.668 | Variable | | |
| 18 | −128.344 | 1.50 | 1.83481 | 42.73 |
| 19 | 32.361 | 2.49 | 1.84666 | 23.78 |
| 20 | 77.856 | Variable | | |
| 21 | 51.855 | 2.50 | 1.83481 | 42.73 |
| 22 | 183.322 | 11.64 | | |
| 23 | ∞ | 4.00 | 1.51633 | 64.14 |
| 24 | ∞ | 0.80 | | |
| Image plane | ∞ | | | |

Various data

| | |
|---|---|
| Focal length | 245.00 |
| FNO. | 4.92 |
| Angle of view | 5.01 |
| Image height | 10.82 |
| fb (in air) | 15.08 |
| Front unit focal length | 338.64 |
| Rear unit focal length | 81.27 |

Focus data

| | inf | 8 m | 4 m |
|---|---|---|---|
| d15 | 1.02 | 1.02 | 1.02 |
| d17 | 1.50 | 8.60 | 17.63 |
| d20 | 17.97 | 10.87 | 1.84 |

Example 7

Unit mm

Surface data

| Surface no. | r | d | nd | vd |
|---|---|---|---|---|
| Object plane | ∞ | ∞ | | |
| 1 | 92.497 | 5.05 | 1.56384 | 60.67 |
| 2 | 216.976 | 27.39 | | |
| 3 | −83.078 | 4.56 | 1.60562 | 43.70 |
| 4 (RS) | −118.230 | −4.56 | 1.60562 | 43.70 |
| 5 | −83.078 | −24.85 | | |
| 6 | −77.917 | −2.54 | 1.68893 | 31.07 |
| 7 | 216.976 | −5.05 | 1.56384 | 60.67 |
| 8 | 92.497 | −1.52 | 1.54814 | 45.79 |
| 9 (RS) | −72.990 | 1.52 | 1.54814 | 45.79 |
| 10 | 92.497 | 5.05 | 1.56384 | 60.67 |
| 11 | 216.976 | 2.54 | 1.68893 | 31.07 |
| 12 | −77.917 | 18.25 | | |
| 13 | −21.580 | 6.60 | 1.84666 | 23.78 |
| 14 | −83.078 | 4.56 | 1.60562 | 43.70 |
| 15 | −118.230 | Variable | | |
| 16 | −117.484 | 2.50 | 1.83481 | 42.73 |
| 17 | −33.725 | Variable | | |
| 18 | −123.741 | 2.50 | 1.84666 | 23.78 |
| 19 | −37.489 | 1.50 | 1.83481 | 42.73 |
| 20 | 80.034 | Variable | | |
| 21 | 51.973 | 2.50 | 1.83481 | 42.73 |
| 22 | 184.374 | 11.64 | | |
| 23 | ∞ | 4.00 | 1.51633 | 64.14 |
| 24 | ∞ | 0.80 | | |
| Image plane | ∞ | | | |

Various data

| | |
|---|---|
| Focal length | 245.00 |
| FNO. | 4.92 |
| Angle of view | 5.01 |
| Image height | 10.82 |
| fb (in air) | 15.08 |
| Front unit focal length | 338.56 |
| Rear unit focal length | 81.15 |

Focus data

| | inf | 8 m | 4 m |
|---|---|---|---|
| d15 | 1.02 | 1.02 | 1.02 |
| d17 | 1.50 | 8.61 | 17.65 |
| d20 | 17.99 | 10.88 | 1.84 |

Example 8

Unit mm

Surface data

| Surface no. | r | d | nd | vd |
|---|---|---|---|---|
| Object plane | ∞ | ∞ | | |
| 1 | 98.193 | 5.05 | 1.56384 | 60.67 |
| 2 | 245.416 | 26.79 | | |
| 3 | −82.656 | 4.56 | 1.60562 | 43.70 |
| 4 (RS) | −117.792 | −4.56 | 1.60562 | 43.70 |
| 5 | −82.656 | −24.25 | | |
| 6 | −75.638 | −2.54 | 1.68893 | 31.07 |
| 7 | 245.416 | −5.05 | 1.56384 | 60.67 |
| 8 | 98.193 | −1.52 | 1.54814 | 45.79 |
| 9 (RS) | −74.873 | 1.52 | 1.54814 | 45.79 |
| 10 | 98.193 | 5.05 | 1.56384 | 60.67 |
| 11 | 245.416 | 2.54 | 1.68893 | 31.07 |
| 12 | −75.638 | 17.65 | | |
| 13 | −27.134 | 6.60 | 1.84666 | 23.78 |
| 14 | −82.656 | 4.56 | 1.60562 | 43.70 |
| 15 | −117.792 | Variable | | |
| 16 | −141.353 | 2.50 | 1.85026 | 32.27 |
| 17 | −30.296 | 1.50 | 1.84666 | 23.78 |
| 18 | −54.908 | Variable | | |
| 19 | −91.505 | 1.50 | 1.83481 | 42.73 |
| 20 | 35.066 | 2.39 | 1.84666 | 23.78 |
| 21 | 91.051 | Variable | | |
| 22 | 52.349 | 2.50 | 1.83481 | 42.73 |
| 23 | 214.022 | 11.58 | | |
| 24 | ∞ | 4.00 | 1.51633 | 64.14 |

-continued

Unit mm

| 25 | ∞ | 0.80 |
| Image plane | ∞ | |

Various data

| Focal length | 245.00 |
| FNO. | 4.92 |
| Angle of view | 5.01 |
| Image height | 10.82 |
| fb (in air) | 15.02 |
| Front unit focal length | 234.56 |
| Rear unit focal length | 182.70 |

Focus data

| | inf | 8 m | 4 m |
|---|---|---|---|
| d15 | 1.00 | 1.00 | 1.00 |
| d18 | 1.50 | 8.29 | 16.96 |
| d21 | 17.27 | 10.49 | 1.81 |

Example 9

Unit mm

Surface data

| Surface no. | r | d | nd | vd |
|---|---|---|---|---|
| Object plane | ∞ | ∞ | | |
| 1 | 146.212 | 5.05 | 1.58913 | 61.14 |
| 2 | 850.082 | 30.66 | | |
| 3 | −85.699 | 4.56 | 1.61772 | 49.81 |
| 4 (RS) | −130.304 | −4.56 | 1.61772 | 49.81 |
| 5 | −85.699 | −28.12 | | |
| 6 | −70.854 | −2.54 | 1.74400 | 44.78 |
| 7 | 850.082 | −5.05 | 1.58913 | 61.14 |
| 8 | 146.212 | −1.52 | 1.51823 | 58.90 |
| 9 (RS) | −79.447 | 1.52 | 1.51823 | 58.90 |
| 10 | 146.212 | 5.05 | 1.58913 | 61.14 |
| 11 | 850.082 | 2.54 | 1.74400 | 44.78 |
| 12 | −70.854 | 21.52 | | |
| 13 | −35.880 | 6.60 | 1.84666 | 23.78 |
| 14 | −85.699 | 4.56 | 1.61772 | 49.81 |
| 15 | −130.304 | Variable | | |
| 16 | −37.033 | 2.11 | 1.83481 | 42.73 |
| 17 | −27.412 | 1.50 | 1.49700 | 81.54 |
| 18 | 118.456 | Variable | | |
| 19 | 45.136 | 2.50 | 1.83400 | 37.16 |
| 20 | 124.655 | 11.79 | | |
| 21 | ∞ | 4.00 | 1.51633 | 64.14 |
| 22 | ∞ | 0.80 | | |
| Image plane | ∞ | | | |

Various data

| Focal length | 245.00 |
| FNO. | 4.92 |
| Angle of view | 5.03 |
| Image height | 10.82 |
| fb (in air) | 15.23 |
| Front unit focal length | 194.15 |
| Rear unit focal length | 942.77 |

Focus data

| | inf | 8 m | 4 m |
|---|---|---|---|
| d15 | 2.05 | 8.99 | 17.98 |
| d18 | 17.93 | 10.99 | 1.99 |

Aberration diagrams of the examples from the first example to the ninth example described heretofore are shown in diagrams from FIG. 13A to FIG. 13H, to diagrams from FIG. 21A to FIG. 21H. In each diagram, FIY denotes the maximum image height.

In the aberration diagrams, FIG. 13A, FIG. 14A, FIG. 15A, FIG. 16A, FIG. 17A, FIG. 18A, FIG. 19A, FIG. 20A, and FIG. 21A show spherical aberration (SA) at the time of focusing at an object at infinity. FIG. 13B, FIG. 14B, FIG. 15B, FIG. 16B, FIG. 17B, FIG. 18B, FIG. 19B, FIG. 20B, and FIG. 21B show astigmatism (AS) at the time of focusing at an object at infinity. FIG. 13C, FIG. 14C, FIG. 15C, FIG. 16C, FIG. 17C, FIG. 18C, FIG. 19C, FIG. 20C, and FIG. 21C show distortion (DT) at the time of focusing at an object at infinity. FIG. 13D, FIG. 14D, FIG. 15D, FIG. 16D, FIG. 17D, FIG. 18D, FIG. 19D, FIG. 20D, and FIG. 21D show chromatic aberration of magnification (CC) at the time of focusing at an object at infinity.

Moreover, FIG. 13E, FIG. 14E, FIG. 15E, FIG. 16E, FIG. 17E, FIG. 18E, FIG. 19E, FIG. 20E, and FIG. 21E show spherical aberration (SA) at the time of focusing at a near object (when distance between an object and an image is 4 m). FIG. 13F, FIG. 14F, FIG. 15F, FIG. 16F, FIG. 17F, FIG. 18F, FIG. 19F, FIG. 20F, and FIG. 21F show astigmatism (AS) at the time of focusing at a near object (when distance between an object and an image is 4 m). FIG. 13G, FIG. 14G, FIG. 15G, FIG. 16G, FIG. 17G, FIG. 18G, FIG. 19G, FIG. 20G, and FIG. 21G show distortion (DT) at the time of focusing at a near object (when distance between an object and an image is 4 m). FIG. 13H, FIG. 14H, FIG. 15H, FIG. 16H, FIG. 17H, FIG. 18H, FIG. 19H, FIG. 20H, and FIG. 21H show chromatic aberration of magnification (CC) at the time of focusing at a near object (when distance between an object and an image is 4 m).

Next, the values of conditional expressions (1) to (7) in each example are shown below.

| | Example 1 | Example 2 | Example 3 | Example 4 | Example 5 |
|---|---|---|---|---|---|
| (1) DFL/MFL | 0.082 | 0.082 | 0.080 | 0.176 | 0.080 |
| (2) MFL/$fb_{min}$ | 1.209 | 1.209 | 1.230 | 0.766 | 1.239 |
| (3) $|y1' - y1|/\Delta s$ | 0.018 | 0.018 | 0.015 | 0.023 | 0.005 |
| (4) $|y0.7' - y0.7|/\Delta s$ | 0.014 | 0.014 | 0.012 | 0.014 | 0.003 |
| (5) $|f_w/f|$ | 0.238 | 0.238 | 0.238 | 0.334 | 0.322 |
| (6) $|f_f/f|$ | 0.271 | 0.271 | 0.277 | 0.334 | 0.322 |
| (7) $\Sigma D_f/\Sigma D_r$ | 1.381 | 1.381 | 1.348 | 2.405 | 1.689 |

| | Example 6 | Example 7 | Example 8 | Example 9 |
|---|---|---|---|---|
| (1) DFL/MFL | 0.247 | 0.248 | 0.252 | 0.226 |
| (2) MFL/$fb_{min}$ | 1.070 | 1.071 | 1.029 | 1.046 |
| (3) $|y1' - y1|/\Delta s$ | 0.020 | 0.020 | 0.038 | 0.007 |
| (4) $|y0.7' - y0.7|/\Delta s$ | 0.015 | 0.015 | 0.026 | 0.004 |
| (5) $|f_w/f|$ | 0.228 | 0.228 | 0.420 | 0.287 |
| (6) $|f_f/f|$ | 0.238 | 0.239 | 0.224 | 0.287 |
| (7) $\Sigma D_f/\Sigma D_r$ | 1.355 | 1.352 | 1.301 | 1.739 |

Also, the element's values of conditional expressions (1) to (9) are shown below.

| | Example 1 | Example 2 | Example 3 | Example 4 | Example 5 |
|---|---|---|---|---|---|
| $f_w$ | 58.28 | 58.28 | 58.21 | −81.9 | −78.99 |
| $f_f$ | −66.34 | −66.28 | −67.75 | −81.9 | −78.99 |
| $f_6$ | 87.62 | 87.58 | 87.94 | 77.82 | 82.97 |
| $\Sigma D_f$ | 38.78 | 38.78 | 38.32 | 42.9 | 41.62 |
| $\Sigma D_r$ | 28.08 | 28.08 | 28.4 | 17.84 | 24.64 |

| | Example 6 | Example 7 | Example 8 | Example 9 |
|---|---|---|---|---|
| $f_w$ | 55.87 | 55.91 | 102.84 | −70.19 |
| $f_f$ | −58.28 | −58.46 | −54.78 | −70.19 |

-continued

| | | | | |
|---|---|---|---|---|
| $f_6$ | 85.87 | 85.96 | 82.43 | 83.64 |
| $\Sigma D_f$ | 38.55 | 38.52 | 37.92 | 41.79 |
| $\Sigma D_r$ | 28.46 | 28.49 | 29.16 | 24.03 |

Figure 22:
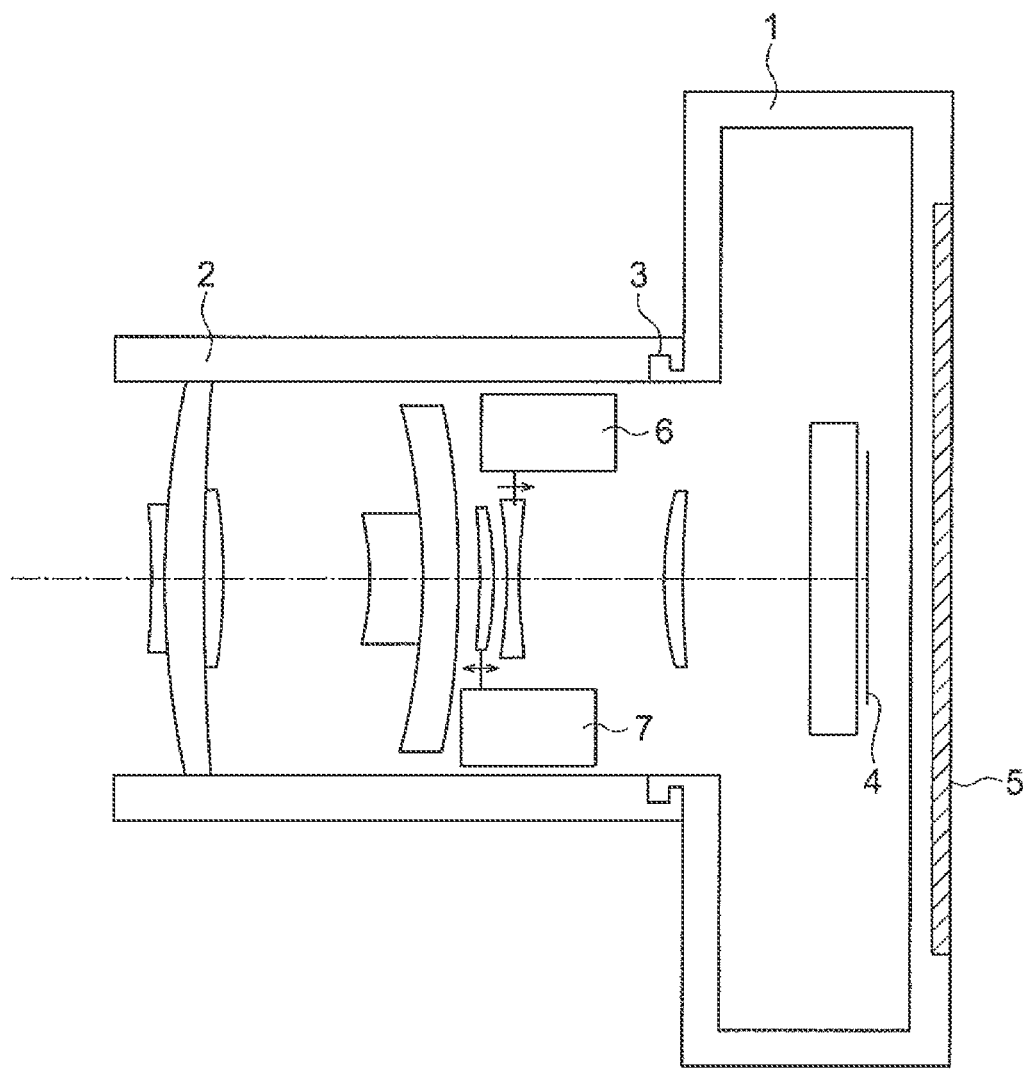
FIG. 22 is a cross-sectional view of an interchangeable lens camera in which, the reflecting telescope optical system according to the present invention has been used as an interchangeable lens.

FIG. 22 is a cross-sectional view of a single-lens mirrorless camera as an electronic image pickup apparatus. In FIG. 22, a taking lens system 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the reflecting telescope optical system according to the present invention described in any one of the examples from the first example to the ninth example is to be used. A moving mechanism member 6 for moving the focusing lens unit Lf and a moving mechanism member 7 for moving the wobbling lens unit Lw are disposed inside the lens barrel.

Figure 23:
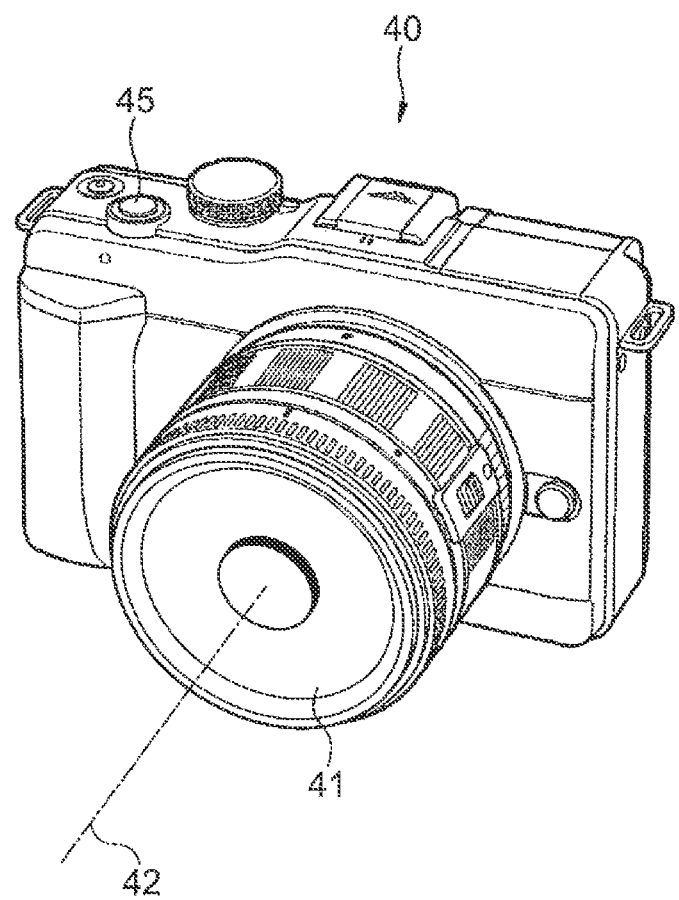
FIG. 23 is a front perspective view showing an appearance of a digital camera according to the present invention.
Figure 24:
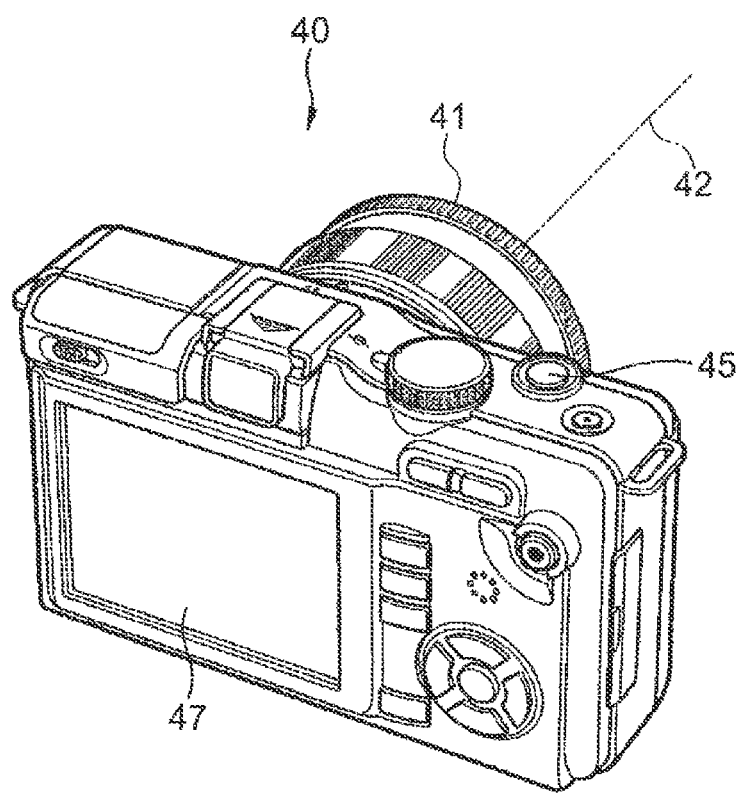
FIG. 24 is a rear perspective view of the digital camera in FIG. 23.

FIG. 23 and FIG. 24 are conceptual diagrams of an arrangement of the image pickup apparatus according to the present invention. FIG. 23 is a front perspective view showing an appearance of a digital camera 40 as the image pickup apparatus, and FIG. 24 is a rear perspective view of the digital camera 40. The reflecting telescope optical system according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the reflecting telescope optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Figure 25:
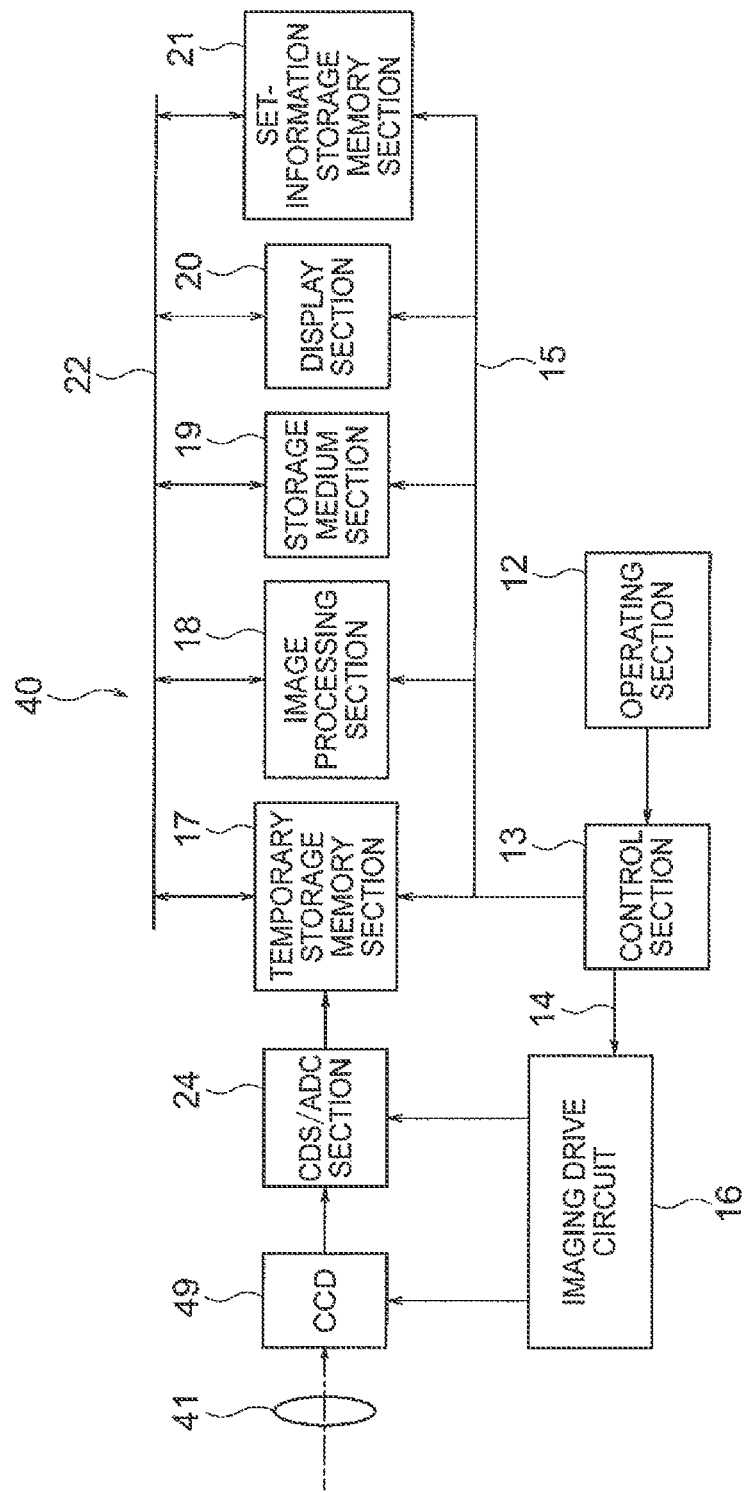
FIG. 25 is a block diagram of an internal circuit of main components of the digital camera in FIG. 23.

FIG. 25 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 25, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 140 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By adopting the reflecting telescope optical system according to the present invention as the photographic optical system in the digital camera 40 which has been structured as described above, it is possible to let the digital camera 40 to be an image pickup apparatus which is favorable for reducing load on a drive mechanism at the time of focusing and video photography.

As it has been described above, the reflecting telescope optical system according to the present invention is useful for a small-size reflecting telescope optical system which is favorable for video photography, and a reflecting telescope optical system which is favorable for reducing load on a drive mechanism at the time of focusing. Moreover, the optical unit and the image pickup apparatus according to the present invention are useful for an optical unit and an image pickup apparatus which include such reflecting telescope optical system.

What is claimed is:

1. A reflecting telescope optical system comprising:
a main reflecting mirror having a first reflecting surface;
a sub reflecting mirror having a second reflecting surface; and
a plurality of lens units, wherein
the first reflecting surface of the main reflecting mirror is a concave surface, and the first reflecting surface has a reflecting area, and
the reflecting area is formed to be ring-shaped, and
the first reflecting surface of the main reflecting mirror and the second reflecting surface of the sub reflecting mirror face each other, and
the second reflecting surface of the sub reflecting mirror and the plurality of lens units faces each other, and
the plurality of lens units has a lens unit which moves along an optical axis of the reflecting telescope optical system, and
a first operation and a second operation are carried out by the lens unit which moves along the optical axis of the plurality of lens units, and
the first operation is a movement for focusing on an object positioned between infinity and a near position, and
the second operation is a reciprocating movement for changing the focused state, and is carried out after completion of the first operation, and
a movement of the second operation is a wobbling function by the lens unit, and
an amount of movement in the first operation is larger than an amount of movement in the second operation, and
the first operation and the second operation are carried out by one lens unit.

2. The reflecting telescope optical system according to claim 1, wherein the lens unit which carries out the second operation and the sub reflecting mirror face each other across the main reflecting mirror.

3. The reflecting telescope optical system according to claim 1, wherein the total number of lenses in the lens unit which carries out the second operation is not more than three.

4. The reflecting telescope optical system according to claim 3, wherein the total number of lenses in the lens unit which carries out the second operation is not more than two.

5. The reflecting telescope optical system according to claim 4, wherein the total number of lenses in the lens unit which carries out the second operation is one.

6. The reflecting telescope optical system according to claim 1, wherein the following conditional expression (1) is satisfied:

$$0.01 < DFL/MFL < 0.3 \tag{1}$$

where,
DFL denotes an optical axial thickness of the lens unit which carries out the first operation,
MFL is expressed by $|L1-L2|$, in which, both L1 and L2 are distances from the lens unit which carries out the first operation, up to an image plane,
L1 denotes a distance at the time of focusing on the object at infinity, and
L2 denotes a distance at the time of focusing on the object at the near position.

7. The reflecting telescope optical system according to claim 1, wherein the following conditional expression (2) is satisfied:

$$0.7 < MFL/fb_{min} < 2.0 \tag{2}$$

where,
$fb_{min}$ denotes a minimum value of back focus at an air conversion length,
MFL is expressed by $|L1-L2|$, in which, both L1 and L2 are distances from the lens unit which carries out the first operation, up to the image plane,
L1 denotes the distance at the time of focusing on the object at infinity, and
L2 denotes the distance at the time of focusing on the object at the near position.

8. The reflecting telescope optical system according to claim 1, wherein
the plurality of lens units includes a fixed lens unit of which a position is fixed, and
the fixed lens unit and the sub reflecting mirror face each other across the main reflecting mirror, and
the fixed lens unit is disposed at a position farthest from the main reflecting mirror.

9. The reflecting telescope optical system according to claim 1, wherein
the reflecting telescope optical system includes a front unit and a rear unit, and
the front unit includes the main reflecting mirror and the sub reflecting mirror, and
a lens unit which carries out the first operation and the second operation, and the sub reflecting mirror face each other across the main reflecting mirror, and
during the first operation, the front unit is fixed, and
the front unit includes a first lens, the main reflecting mirror, and the sub reflecting mirror, in order of traveling of light, and
the main reflecting mirror is a back-surface mirror, and
the sub reflecting mirror is a back-surface mirror, and is disposed adjacent to the first lens.

10. The reflecting telescope optical system according to claim 9, wherein
the front unit includes a second lens and a third lens, and
the first lens is a positive meniscus lens having a convex surface directed toward an object side, and
the sub reflecting mirror is cemented to an object-side surface of the first lens, and
the second lens is cemented to an image-side surface of the first lens, and
the third lens is cemented to an object-side surface of the main reflecting mirror.

11. The reflecting telescope optical system according to claim 9, wherein
the rear unit includes in order from an object side to an image side, the lens unit which carries out the first operation and the second operation, and a fixed lens unit having a positive refractive power, of which a position is fixed, and
the lens unit which carries out the first operation and the second operation has a negative refractive power.

12. The reflecting telescope optical system according to claim 9, wherein
the following conditional expressions (3) and (4) are satisfied:

$$|y1'-y1|/\Delta s < 0.10 \tag{3}$$

$$|y0.7'-y0.7|/\Delta s < 0.10 \tag{4}$$

where,
y1 denotes the maximum image height at the time of focusing on the object at infinity, y0.7 is 0.7 times of the maximum image height, and is expressed by y1×0.7, y1' denotes a height of a light ray at a position at which, a first virtual principal ray intersects with an image pickup surface when a defocus amount Δs is generated at the time of focusing on the object at infinity, y0.7' denotes a height of a light ray at a position at which, a second virtual principal ray intersects with the image pickup surface when the defocus amount Δs is generated at the time of focusing on the object at infinity, Δs denotes a defocus amount which is generated in the second operation, and is expressed by 8×y1/1000, the first virtual principal ray is a virtual principal ray with an angle of view same as of a ray which reaches the image height y1 at the time of focusing on the object at infinity, the second virtual principal ray is a virtual principal ray with an angle of view same as of a ray which reaches the image height y0.7 at the time of focusing on the object at infinity, a virtual principal ray is a virtual ray which passes through a point at which a surface on the object side of the first lens and the optical axis intersect, and unit of each of y1, y0.7, y1', y0.7', and Δs is mm.

13. The reflecting telescope optical system according to claim 9, wherein the following conditional expression (7) is satisfied:

$$1.0 < \Sigma D_f / \Sigma D_r < 3.0 \qquad (7)$$

where, $\Sigma D_f$ denotes the maximum value of the optical axial length from a surface nearest to the object side of the front unit up to a surface nearest to the image side of the front unit, and $\Sigma D_r$ denotes the maximum value of the optical axial length from a surface nearest to the object side of the rear unit up to a surface nearest to the image side of the rear unit.

14. The reflecting telescope optical system according to claim 1, wherein the following conditional expression (5) is satisfied:

$$0.13 < |f_w/f| < 0.52 \qquad (5)$$

where, f denotes a focal length of the overall reflecting telescope optical system at the time of focusing on the object at infinity, and $f_w$ denotes a focal length of the lens unit which carries out the second operation.

15. An optical unit comprising:
a reflecting telescope optical system according to claim 1; and
a holding member which holds the reflecting telescope optical system, wherein
the holding member includes a mount portion which is installable on and detachable from a main-body of an image pickup apparatus.

16. An optical unit comprising:
a reflecting telescope optical system according to claim 1;
a first motor which is disposed on an image side with respect to the main reflecting mirror, and outside an optical path; and
a first drive section which carries out the first operation by driving the first motor.

17. An optical unit comprising:
a reflecting telescope optical system according to claim 1;
a first motor which is disposed on an image side with respect to the main reflecting mirror, and outside an optical path; and
a second drive section which carries out the second operation by driving the first motor.

18. An image pickup apparatus comprising:
a reflecting telescope optical system according to claim 1; and
an image pickup element which is disposed on an image side of the reflecting telescope optical system, and which converts an image formed by the reflecting telescope optical system, to an electric signal.

19. A reflecting telescope optical system comprising:
a main reflecting mirror having a first reflecting surface;
a sub reflecting mirror having a second reflecting surface; and
a lens unit, wherein
the first reflecting surface of the main reflecting mirror is a concave surface, and the first reflecting surface has a reflecting area and
the reflecting area is formed to be ring-shaped, and
the first reflecting surface of the main reflecting mirror and the second reflecting surface of the sub reflecting mirror face each other, and
a first operation is carried out by the lens unit, and
the first operation is a movement for focusing on an object positioned between infinity and a near position, and
during the first operation, the lens unit and the sub reflecting mirror face each other across the main reflecting mirror, and
the following conditional expression (6) is satisfied:

$$0.12 < |f_f/f| < 0.43 \qquad (6)$$

where, f denotes a focal length of the overall reflecting telescope optical system at the time of focusing on the object at infinity, and $f_f$ denotes a focal length of the lens unit which carries out the first operation.

20. The reflecting telescope optical system according to claim 19, wherein the total number of lenses in the lens unit which carries out the first operation is not more than three.

21. The reflecting telescope optical system according to claim 20, wherein the total number of lenses in the lens unit which carries out the first operation is not more than two.

22. The reflecting telescope optical system according to claim 21, wherein the total number of lenses in the lens unit which carries out the first operation is one.

23. The reflecting telescope optical system according to claim 19, wherein
the reflecting telescope optical system includes a front unit and a rear unit, and
the front unit includes the main reflecting mirror and the sub reflecting mirror, and
the rear unit includes the lens unit, and
the rear unit and the sub reflecting mirror face each other across the main reflecting mirror, and
during the first operation, the front unit is fixed, and
the front unit includes a first lens, the main reflecting mirror, and the sub reflecting mirror, in order of traveling of light, and
the main reflecting mirror is a back-surface mirror, and
the sub reflecting mirror is a back-surface mirror, and is disposed adjacent to the first lens.

24. The reflecting telescope optical system according to claim 23, wherein the total number of lenses in the rear unit is not more than three.

25. The reflecting telescope optical system according to claim 19, wherein the following conditional expression (6') is satisfied:

$$0.17 < |f_f/f| < 0.38 \quad (6')$$

where,
f denotes the focal length of the overall reflecting telescope optical system at the time of focusing on the object at infinity, and
$f_f$ denotes a focal length of the lens unit which carries out the first operation.

26. The reflecting telescope optical system according to claim 19, wherein the second reflecting surface of the sub reflecting mirror is a convex surface.

27. A reflecting telescope optical system comprising:
a main reflecting mirror having a first reflecting surface;
a sub reflecting mirror having a second reflecting surface; and
a plurality of lens units, wherein
the first reflecting surface of the main reflecting mirror is a concave surface, and the first reflecting surface has a reflecting area, and
the reflecting area is formed to be ring-shaped, and
the first reflecting surface of the main reflecting mirror and the second reflecting surface of the sub reflecting mirror face each other, and
the second reflecting surface of the sub reflecting mirror and the plurality of lens units faces each other, and
the plurality of lens units has a lens unit which moves along an optical axis of the reflecting telescope optical system, and
a first operation and a second operation are carried out by the lens unit, which moves along the optical axis, of the plurality of lens units, and
the first operation is a movement for focusing on an object positioned between infinity and a near position, and
the second operation is a reciprocating movement for changing the focused state, and is carried out after the first operation, and
an amount of movement in the first operation is larger than an amount of movement in the second operation, and
the first operation and the second operation are carried out by different lens units, and
the lens unit which carries out the first operation and the sub reflecting mirror face each other across the main reflecting mirror.

28. The reflecting telescope optical system according to claim 27, wherein the lens unit which carries out the second operation and the sub reflecting mirror face each other across the main reflecting mirror.

29. The reflecting telescope optical system according to claim 27, wherein the total number of lenses in the lens unit which carries out the second operation is not more than three.

30. The reflecting telescope optical system according to claim 27, wherein the total number of lenses in the lens unit which carries out the first operation is not more than three.

31. The reflecting telescope optical system according to claim 27, wherein the following conditional expression (1) is satisfied:

$$0.01 < DFL/MFL < 0.3 \quad (1)$$

where,
DFL denotes an optical axial thickness of the lens unit which carries out the first operation,
MFL is expressed by |L1−L2|, in which, both L1 and L2 are distances from the lens unit which carries out the first operation, up to an image plane,
L1 denotes a distance at the time of focusing on the object at infinity, and
L2 denotes a distance at the time of focusing on the object at the near position.

32. The reflecting telescope optical system according to claim 27, wherein the following conditional expression (2) is satisfied:

$$0.7 < MFL/fb_{min} < 2.0 \quad (2)$$

where,
$fb_{min}$ denotes a minimum value of back focus at an air conversion length,
MFL is expressed by |L1−L2|, in which, both L1 and L2 are distances from the lens unit which carries out the first operation, up to the image plane,
L1 denotes the distance at the time of focusing on the object at infinity, and
L2 denotes the distance at the time of focusing on the object at the near position.

33. The reflecting telescope optical system according to claim 27, wherein
the plurality of lens units includes a fixed lens unit of which, a position is fixed, and
the fixed lens unit and the sub reflecting mirror face each other across the main reflecting mirror, and
the fixed lens unit is disposed at a position farthest from the main reflecting mirror.

34. The reflecting telescope optical system according to claim 27, wherein
the reflecting telescope optical system includes a front unit and a rear unit, and
the front unit includes the main reflecting mirror and the sub reflecting mirror, and
a lens unit which carries out the first operation and a lens unit which carries out the second operation, and the sub reflecting mirror face each other across the main reflecting mirror, and
during the first operation, the front unit is fixed, and
the front unit includes a first lens, the main reflecting mirror, and the sub reflecting mirror, in order of traveling of light, and
the main reflecting mirror is a back-surface mirror, and
the sub reflecting mirror is a back-surface mirror, and is disposed adjacent to the first lens.

35. The reflecting telescope optical system according to claim 34, wherein
the front unit includes a second lens and a third lens, and
the first lens is a positive meniscus lens having a convex surface directed toward an object side, and
the sub reflecting mirror is cemented to an object-side surface of the first lens, and
the second lens is cemented to an image-side surface of the first lens, and
the third lens is cemented to an object-side surface of the main reflecting mirror.

36. The reflecting telescope optical system according to claim 34, wherein
the rear unit includes in order from an object side to an image side, a lens unit which carries out the second operation, a lens unit which carries out the first operation, and a lens unit having a positive refractive power, of which, a position is fixed, and
the lens unit which carries out the first operation has a negative refractive power.

37. The reflecting telescope optical system according to claim 34, wherein the following conditional expression (7) is satisfied:

$$1.0 < \Sigma D_f / \Sigma D_r < 3.0 \quad (7)$$

where, $\Sigma D_f$ denotes the maximum value of an optical axial length from a surface nearest to the object side of the front unit up to a surface nearest to the image side of the front unit, and $\Sigma D_r$ denotes the maximum value of an optical axial length from a surface nearest to the object side of the rear unit up to a surface nearest to the image side of the rear unit.

38. The reflecting telescope optical system according to claim 27, wherein the lens which carries out the second operation has a positive refractive power.

39. The reflecting telescope optical system according to claim 27, wherein the following conditional expressions (3) and (4) are satisfied:

$$|y1' - y1|/\Delta s < 0.10 \quad (3)$$

$$|y0.7' - y0.7|/\Delta s < 0.10 \quad (4)$$

where, y1 denotes the maximum image height at the time of focusing on the object at infinity, y0.7 is 0.7 times of the maximum image height, and is expressed by y1×0.7, y1' denotes a height of a light ray at a position at which, a first virtual principal ray intersects with an image pickup surface when a defocus amount Δs is generated at the time of focusing on the object at infinity, y0.7' denotes a height of a light ray at a position at which, a second virtual principal ray intersects with the image pickup surface when the defocus amount Δs is generated at the time of focusing on the object at infinity, Δs denotes a defocus amount which is generated in the second operation, and is expressed by 8×y1/1000, the first virtual principal ray is a virtual principal ray with an angle of view same as of a ray which reaches the image height y1 at the time of focusing on the object at infinity, the second virtual principal ray is a virtual principal ray with an angle of view same as of a ray which reaches the image height y0.7 at the time of focusing on the object at infinity, a virtual principal ray is a virtual ray which passes through a point at which a surface on the object side of the first lens and the optical axis intersect, and unit of each of y1, y0.7, y1', y0.7', and Δs is mm.

40. The reflecting telescope optical system according to claim 27, wherein the following conditional expression (5) is satisfied:

$$0.13 < |f_w/f| < 0.52 \quad (5)$$

where, f denotes a focal length of the overall reflecting telescope optical system at the time of focusing on the object at infinity, and $f_w$ denotes a focal length of the lens unit which carries out the second operation.

41. The reflecting telescope optical system according to claim 27, wherein the following conditional expression (6) is satisfied:

$$0.12 < |f_f/f| < 0.43 \quad (6)$$

where, f denotes the focal length of the overall reflecting telescope optical system at the time of focusing on the object at infinity, and $f_f$ denotes a focal length of the lens unit which carries out the first operation.

* * * * *